(12) United States Patent
Heubel et al.

(10) Patent No.: US 9,829,977 B2
(45) Date of Patent: Nov. 28, 2017

(54) METHOD AND APPARATUS FOR PROVIDING MULTI-POINT HAPTIC FEEDBACK TEXTURE SYSTEMS

(75) Inventors: Robert W. Heubel, San Leandro, CA (US); Ryan Steger, Sunnyvale, CA (US); Robert A. Lacroix, Saint-Lambert (CA); Muge Bakircioglu, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 1935 days.

(21) Appl. No.: 12/061,463

(22) Filed: Apr. 2, 2008

(65) Prior Publication Data

US 2009/0250267 A1    Oct. 8, 2009

(51) Int. Cl.
| | |
|---|---|
| G06K 11/06 | (2006.01) |
| G08C 21/00 | (2006.01) |
| G06F 3/01 | (2006.01) |
| G06F 3/041 | (2006.01) |
| G06F 3/0488 | (2013.01) |

(52) U.S. Cl.
CPC ........... *G06F 3/016* (2013.01); *G06F 3/041* (2013.01); *G06F 3/04886* (2013.01); *G06F 2203/013* (2013.01); *G06F 2203/04809* (2013.01)

(58) Field of Classification Search
USPC ................. 345/156, 163, 173, 107; 434/114
See application file for complete search history.

(56) References Cited

U.S. PATENT DOCUMENTS

| | | | |
|---|---|---|---|
| 5,541,372 A * | 7/1996 | Baller et al. ............... | 178/18.01 |
| 5,543,588 A | 8/1996 | Bisset et al. | |
| 6,337,678 B1 * | 1/2002 | Fish ............................. | 345/156 |
| 6,429,846 B2 * | 8/2002 | Rosenberg et al. ........... | 345/156 |
| 6,819,312 B2 | 11/2004 | Fish | |

(Continued)

FOREIGN PATENT DOCUMENTS

| | | |
|---|---|---|
| JP | 2002-287885 A | 10/2002 |
| JP | 2004-508506 | 3/2004 |

(Continued)

OTHER PUBLICATIONS

Office Action issued for Japanese Patent Application No. 2011-502998, dated May 14, 2013.

(Continued)

*Primary Examiner* — Benjamin C Lee
*Assistant Examiner* — Dong Hui Liang
(74) *Attorney, Agent, or Firm* — Kilpatrick Townsend & Stockton LLP

(57) ABSTRACT

A method and apparatus for generating haptic surface texture with a deformable surface layer are disclosed. The haptic device includes a flexible surface layer, a haptic substrate, and a deforming mechanism. The flexible surface layer is made of elastic materials and is capable of reconfiguring its surface characteristics. The haptic substrate, in one embodiment, provides a first pattern in response to a first activating signal. Alternatively, the haptic substrate is capable of providing a second pattern in accordance with a second activating signal. The deforming mechanism is configured to change the flexible surface from a first surface characteristic to a second surface characteristic in accordance with the first pattern.

17 Claims, 16 Drawing Sheets

(56) References Cited

U.S. PATENT DOCUMENTS

| | | | |
|---|---|---|---|
| 6,940,485 B2* | 9/2005 | Noolandi | 345/107 |
| 7,009,595 B2* | 3/2006 | Roberts et al. | 345/156 |
| 7,030,860 B1* | 4/2006 | Hsu et al. | 345/173 |
| 7,113,177 B2* | 9/2006 | Franzen | 345/173 |
| 7,205,981 B2* | 4/2007 | Cunningham | 345/163 |
| 7,497,687 B2* | 3/2009 | Shin | 343/114 |
| 2002/0054060 A1 | 5/2002 | Schena | |
| 2005/0030292 A1 | 2/2005 | Diederiks | |
| 2005/0040962 A1 | 2/2005 | Funkhouser et al. | |
| 2005/0057528 A1* | 3/2005 | Kleen | 345/173 |
| 2005/0209741 A1 | 9/2005 | Cunningham | |
| 2008/0068334 A1 | 3/2008 | Olien et al. | |
| 2009/0167704 A1* | 7/2009 | Terlizzi et al. | 345/173 |

FOREIGN PATENT DOCUMENTS

| | | |
|---|---|---|
| JP | 2004-145456 | 5/2004 |
| JP | 2006-243812 | 9/2006 |
| JP | 2008-033616 | 2/2008 |
| WO | WO 2006/042309 | 4/2006 |

OTHER PUBLICATIONS

TactaPad: www.tactiva.com, 6 pages.
Notice of Preliminary Rejection issued in Korean Patent Application No. 10-2010-7023804, dated Jan. 21, 2015.
International Preliminary Report on Patentability as issued for PCT/US2009/030139, dated Oct. 14, 2010.

* cited by examiner

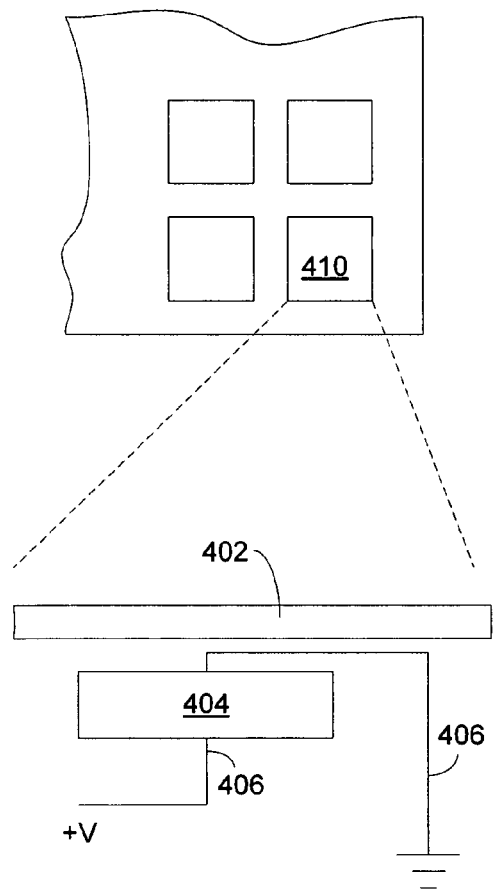
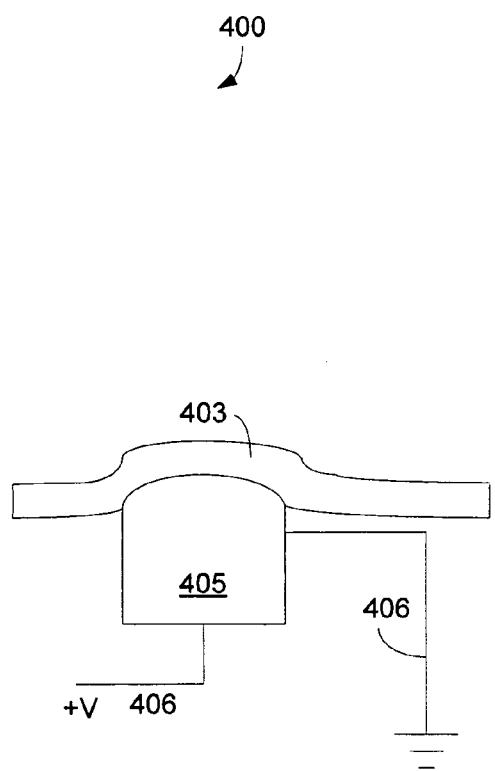
FIG 4(a)　　　　FIG 4(b)

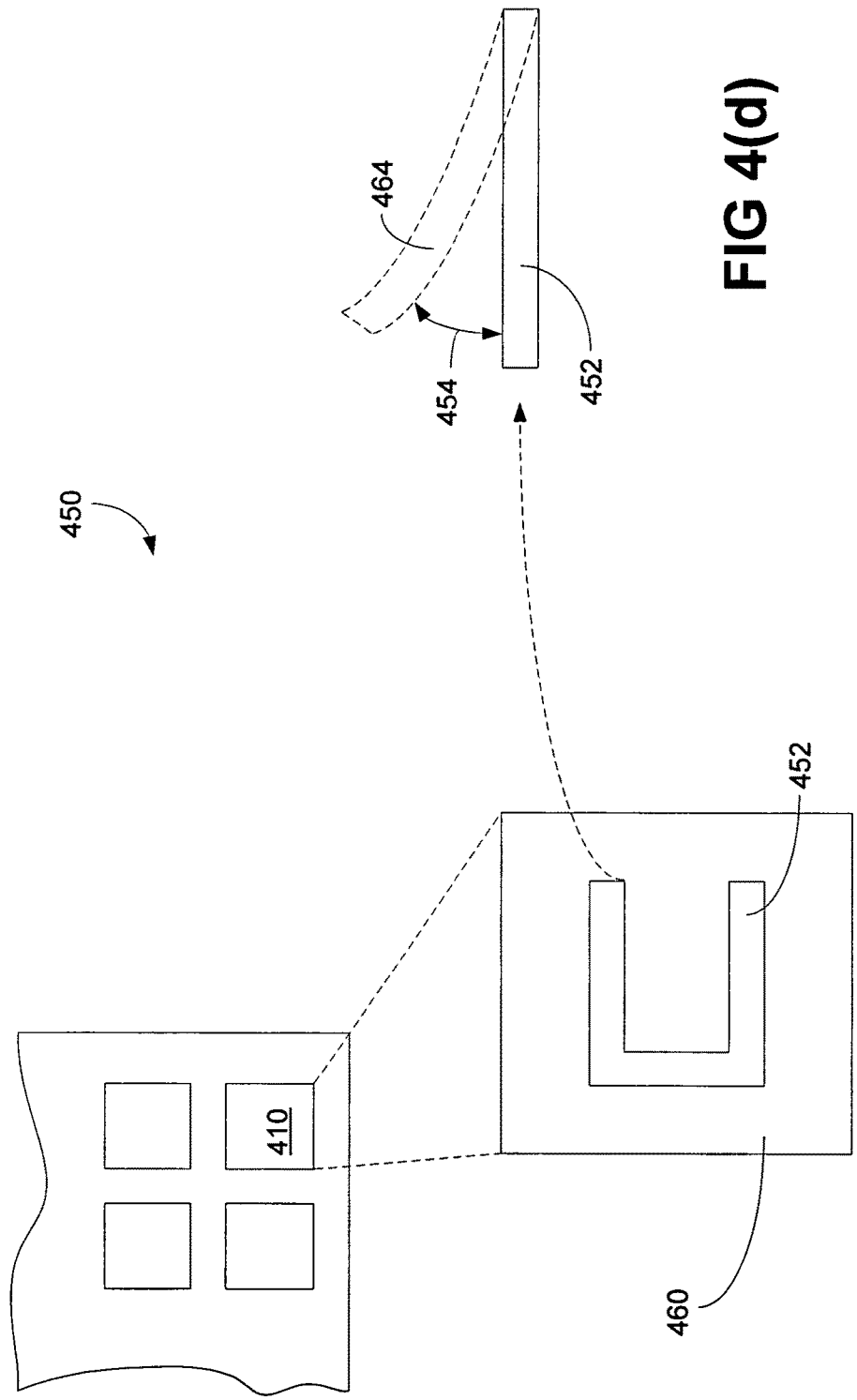

METHOD AND APPARATUS FOR PROVIDING MULTI-POINT HAPTIC FEEDBACK TEXTURE SYSTEMS

RELATED APPLICATIONS

This application is related to the following co-pending applications, each assigned to the Assignee of the present invention.

a. application Ser. No. 11/823,192, filed Jun. 26, 2007, entitled "Method and Apparatus for Multi-touch Tactile Touch Panel Actuator Mechanisms";

b. application Ser. No. 11/823,258, filed Jun. 26, 2007, entitled "Method and Apparatus for Multi-touch Haptic Touch Panel Actuator Mechanisms"; and c. application Ser. No. 11/943,862, filed Nov. 21, 2007, entitled "Method and Apparatus for Providing a Fixed Relief Touch Screen with Locating Features Using Deformable Haptic Surfaces."

FIELD

The exemplary embodiment(s) of the present invention relates to a field of electronic interface devices. More specifically, the exemplary embodiment(s) of the present invention relates to an interface device with haptic feedback.

BACKGROUND

As computer-based systems, appliances, automated teller machines, point of sale terminals and the like have become more prevalent in recent years, the ease of use of the human-machine interface has become increasingly important. A conventional touch-sensitive panel usually has a smooth flat surface and uses sensors such as capacitive sensors and/or pressure sensors to sense locations being touched by a finger(s) and/or an object(s). For example, a user presses a region of a touch screen commonly with a fingertip to emulate a button press and/or moves his or her finger on the panel according to the graphics displayed behind the panel on the display device.

In the real world, there exists a wide variety of surface textures. Textures are used to describe visual structures as well as feel of touching to various surfaces. For a human-computer interface device, a user is often presented with virtual textures in the form of images displayed on computer screens. For example, images of sandpaper and/or corduroy may be seen, but the user typically can not feel what the sandpaper or corduroy feels like when he or she touches the display or touch screen. If a touch screen or surface is used, the texture of that screen may be felt as a typical smooth surface, which usually does not simulate texture(s) of what those on-screen images are displaying. Even if the touch screen or touch surface is coated with an artificial texture such as a raised surface, the user is only able to feel a single coated texture.

A problem associated with the conventional touch-sensitive panel is that it does not provide configurable texture information to a user. Another problem associated with the conventional touch-sensitive panel is the inability to provide input confirmation when a user enters an input outside of visual cues, or audible cues when coupled with a sound system. For example, when a user presses a location on a conventional touch-sensitive panel, the panel typically does not have the capability to confirm the selected input instantaneously as would a mechanical switch.

SUMMARY

A method and surface reconfigurable haptic device capable of providing a haptic texture using a deformable surface are disclosed. The surface reconfigurable haptic device includes a flexible surface, a haptic substrate, and a deforming mechanism. The flexible surface is a soft and elastic layer, which is capable of changing its surface characteristics from one texture to another texture. The haptic substrate, in one embodiment, provides a first pattern in response to a first activating signal. Alternatively, the haptic substrate provides a second pattern in accordance with a second activating signal. The deforming mechanism is configured to change the flexible surface from a first surface characteristic to a second surface characteristic in accordance with the first pattern.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

FIGS. 4(a-d) illustrate examples of haptic cells in a haptic device employing piezoelectric materials and Micro-Electro-Mechanical Systems ("MEMS") elements in accordance with one embodiment of the present invention;

DETAILED DESCRIPTION

Exemplary embodiments of the present invention are described herein in the context of a method, system and apparatus for providing haptic surface texture on a flexible surface.

Those skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

A user interface device having a haptic textured surface over a deformable surface layer using various haptic actuators is disclosed. The device includes a flexible surface layer, a haptic substrate, and a deforming mechanism. The flexible surface layer, for instance, is made of soft and/or elastic material, which is capable of changing its surface configuration from one texture (i.e., haptic substrate) to another texture. The haptic substrate, in one embodiment, provides a first pattern in response to a first activating signal. Alternatively, the haptic substrate can provide a second pattern in accordance with a second activating signal. The deforming mechanism is used to change the texture of the flexible surface from a first surface characteristic to a second surface characteristic.

Figure 1A:
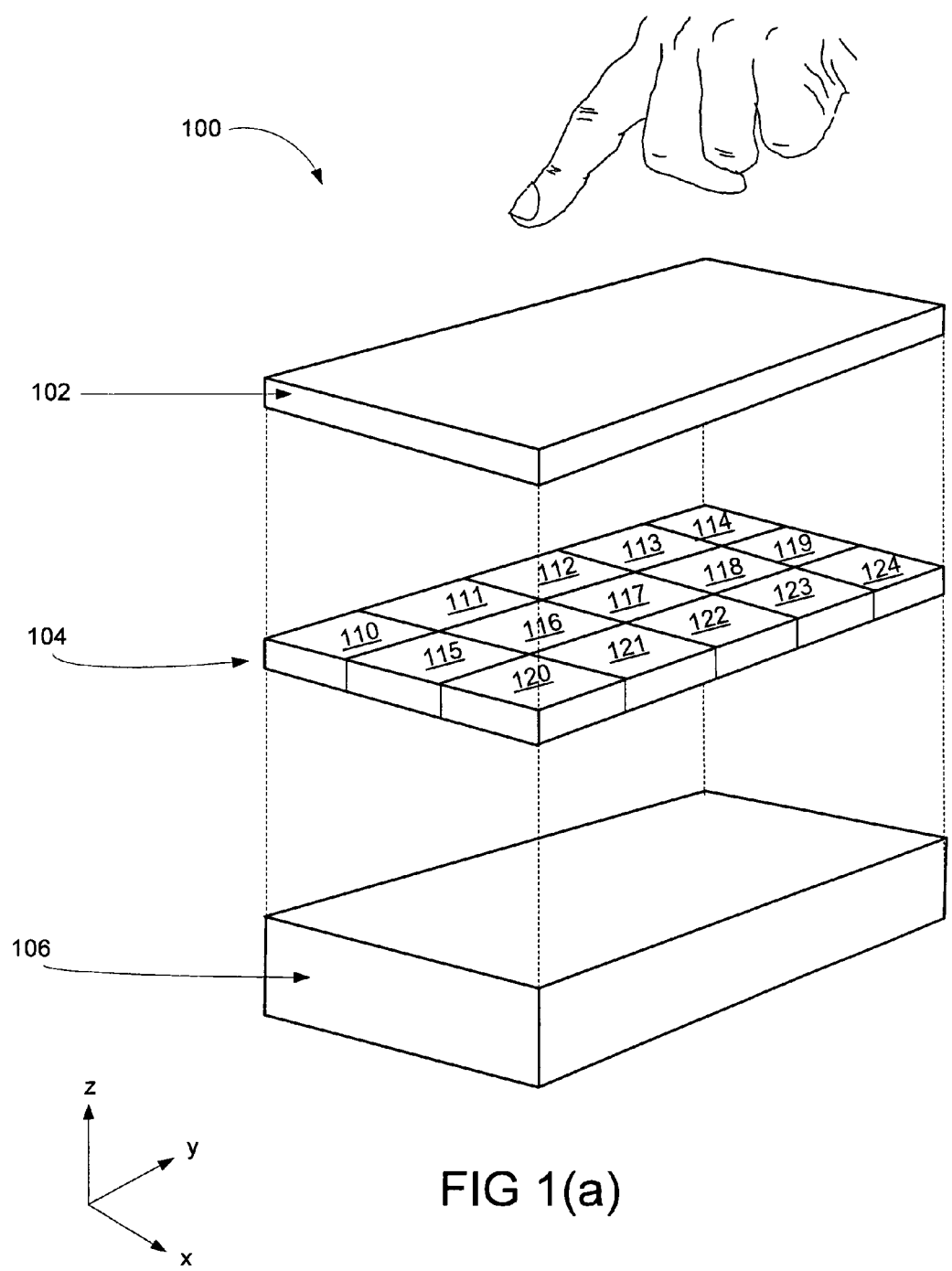
FIGS. 1(a-e) illustrate haptic devices using haptic substrates and flexible surfaces in accordance with one embodiment of the present invention.

FIG. 1(a) shows a three-dimensional (3D) diagram illustrating a haptic device 100 using a haptic substrate and a flexible surface in accordance with one embodiment of the present invention. Device 100 includes a flexible surface layer 102, a haptic substrate 104, and a deforming mechanism 106. It should be noted that device 100 can be a user interface device, such as an interface for a cellular phone, a personal digital assistant ("PDA"), an automotive data input system, and so forth. It should be further noted that the underlying concept of the exemplary embodiment of the present invention would not change if one or more blocks (circuits or layers) were added to or removed from device 100.

Flexible surface layer 102, in one instance, is made of soft and/or elastic materials such as silicone rubber, which is also known as polysiloxane. A function of the flexible surface layer 102 is to change its surface shape or texture upon contact with the physical pattern of haptic substrate 104. The physical pattern of haptic substrate 104 is variable as one or more of the local features 110-124 can be raised or lowered to present features to affect the surface of the flexible surface layer 102 upon contact. Once the physical pattern of haptic substrate 104 is determined, the texture of flexible surface layer 102 can change to confirm its surface texture to the physical pattern of haptic substrate 104. It should be note that the deformation of flexible surface layer 102 from one texture to another can be controlled by deforming mechanism 106. For example, when deforming mechanism 106 is not activated, flexible surface layer 102 maintains its smooth configuration floating or sitting over haptic substrate 104. The surface configuration of flexible surface layer 102, however, deforms or changes from a smooth configuration to a coarse configuration when deforming mechanism 106 is activated and the haptic substrate 104 is in contact with the flexible surface layer 102 so as to generate a similar pattern on the top surface of the flexible surface layer 102.

Alternatively, flexible surface layer 102 is a flexible touch sensitive surface, which is capable of accepting user inputs. The flexible touch sensitive surface can be divided into multiple regions wherein each region of the flexible touch sensitive surface can accept an input when the region is being touched or depressed by a finger. In one embodiment, the flexible touch sensitive surface includes a sensor, which is capable of detecting a nearby finger and waking up or turning on the device. Flexible surface layer 102 may also include a flexible display, which is capable of deforming together with flexible surface layer 102. It should be noted that various flexible display technologies can be used to manufacture flexible displays, such as organic light-emitting diode (OLED), organic, or polymer TFT (Thin Film Transistor).

Haptic substrate 104 is a surface reconfigurable haptic device capable of changing its surface pattern in response to one or more pattern activating signals. Haptic substrate 104 can also be referred to as a haptic mechanism, a haptic layer, a tactile element, and the like. Haptic substrate 104, in one embodiment, includes multiple tactile or haptic regions 110-124, wherein each region can be independently controlled and activated. Since each tactile region can be independently activated, a unique surface pattern of haptic substrate 104 can be composed in response to the pattern activating signals. In another embodiment, every tactile region is further divided into multiple haptic bits wherein each bit can be independently excited or activated or deactivated.

Haptic substrate 104, or a haptic mechanism, in one embodiment, is operable to provide haptic feedback in response to an activating command or signal. Haptic substrate 104 provides multiple tactile or haptic feedbacks wherein one tactile feedback is used for surface deformation, while another tactile feedback is used for input confirmation. Input confirmation is a haptic feedback to inform a user about a selected input. Haptic mechanism 104, for example, can be implemented by various techniques including vibration, vertical displacement, lateral displacement, push/pull technique, air/fluid pockets, local deformation of materials, resonant mechanical elements, piezoelectric materials, micro-electro-mechanical systems ("MEMS") elements, thermal fluid pockets, MEMS pumps, variable porosity membranes, laminar flow modulation, or the like.

Haptic substrate 104, in one embodiment, is constructed by semi-flexible or semi-rigid materials. In one embodiment, haptic substrate should be more rigid than flexible surface 102 thereby the surface texture of flexible surface 102 can confirm to the surface pattern of haptic substrate 104. Haptic substrate 104, for example, includes one or more actuators, which can be constructed from fibers (or nanotubes) of electroactive polymers ("EAP"), piezoelectric elements, fiber of shape memory alloys ("SMAs") or the like. EAP, also known as biological muscles or artificial muscles, is capable of changing its shape in response to an application of voltage. The physical shape of an EAP may be deformed when it sustains large force. EAP may be constructed from Electrostrictive Polymers, Dielectric elastomers, Conducting Polymers, Ionic Polymer Metal Composites, Responsive Gels, Bucky gel actuators, or a combination of the above-mentioned EAP materials.

SMA (Shape Memory Alloy), also known as memory metal, is another type of material which can be used to construct haptic substrate 104. SMA may be made of copper-zinc-aluminum, copper-aluminum-nickel, nickel-titanium alloys, or a combination of copper-zinc-aluminum, copper-aluminum-nickel, and/or nickel-titanium alloys. A characteristic of SMA is that when its original shape is deformed, it regains its original shape in accordance with the ambient temperature and/or surrounding environment. It should be noted that the present embodiment may combine the EAP, piezoelectric elements, and/or SMA to achieve a specific haptic sensation.

Deforming mechanism 106 provides a pulling and/or pushing force to translate elements in the haptic substrate 104 causing flexible surface 102 to deform. For example, when deforming mechanism 106 creates a vacuum between flexible surface 102 and haptic substrate 104, flexible surface 102 is pushed against haptic substrate 104 causing flexible surface 102 to show the texture of flexible surface 102 in accordance with the surface pattern of haptic substrate 104. In other words, once a surface pattern of haptic substrate 104 is generated, flexible surface is pulled or pushed against haptic substrate 104 to reveal the pattern of haptic substrate 104 through the deformed surface of flexible surface 102. In one embodiment, haptic substrate 104 and deforming mechanism 106 are constructed in the same or substantially the same layer.

Upon receipt of a first activating signal, haptic substrate 104 generates a first surface pattern. After formation of the surface pattern of haptic substrate 104, deforming mechanism 106 is subsequently activated to change surface texture of flexible surface 102 in response to the surface pattern of haptic substrate 104. Alternatively, if haptic substrate 104 receives a second activating signal, it generates a second pattern.

Haptic substrate 104 further includes multiple tactile regions wherein each region can be independently activated to form a surface pattern of the substrate. Haptic substrate 104 is also capable of generating a confirmation feedback to confirm an input selection entered by a user. Deforming mechanism 106 is configured to deform the surface texture of flexible surface 102 from a first surface characteristic to a second surface characteristic. It should be noted that haptic device further includes a sensor, which is capable of activating the device when the sensor detects a touch on flexible surface 102. Deforming mechanism 106 may be a vacuum generator, which is capable of causing flexible surface 102 to collapse against the first surface pattern to transform its surface configuration in accordance with the configuration of first pattern of haptic substrate 104.

Figure 1B:
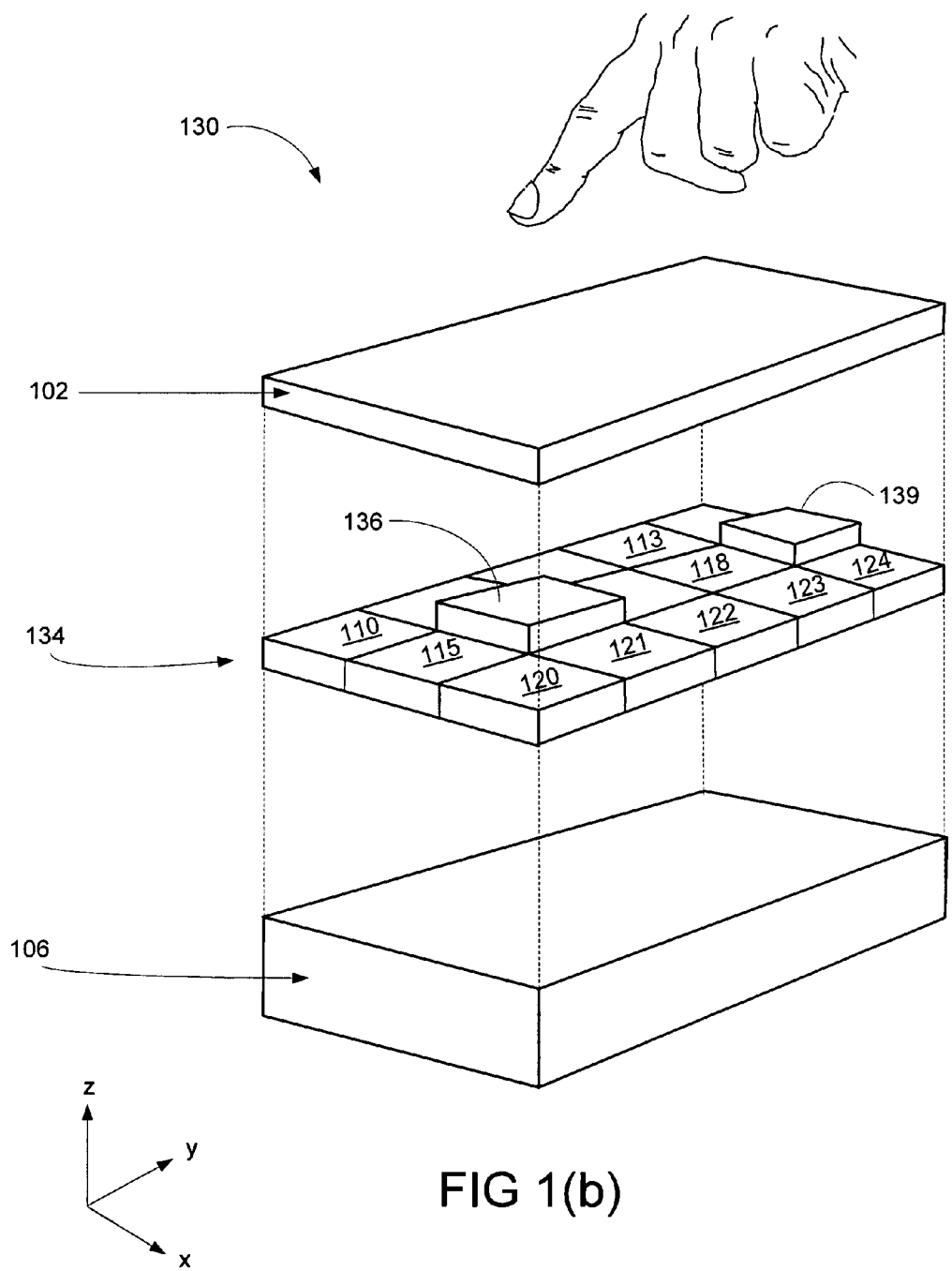

FIG. 1(b) shows a 3D diagram illustrating a haptic device 130 using a haptic substrate and a flexible surface in accordance with one embodiment of the present invention. Device 130 includes a flexible surface 102, a haptic substrate 134, and a deforming mechanism 106. It should be noted that the underlying concept of the exemplary embodiment of the present invention would not change if additional blocks (circuits or layers) were added to or removed from device 130.

Haptic substrate 134 is similar or substantially similar to haptic substrate 104 illustrated in FIG. 1(a) except that tactile regions 136 and 139 are activated. Tactile regions 136 and 139 are raised in a z-axis direction. Upon receipt of one or more activating signals, haptic substrate 134 identifies a surface pattern in accordance with the activating signals. Haptic substrate 134 provides identified pattern by activating various tactile regions such as regions 136 and 139 to generate the pattern. It should be noted that tactile regions 136 and 139 imitate two buttons or keys. In another embodiment, tactile region 136 or 139 includes multiple haptic bits wherein each bit can be controlled for activating or deactivating.

Figure 1C:
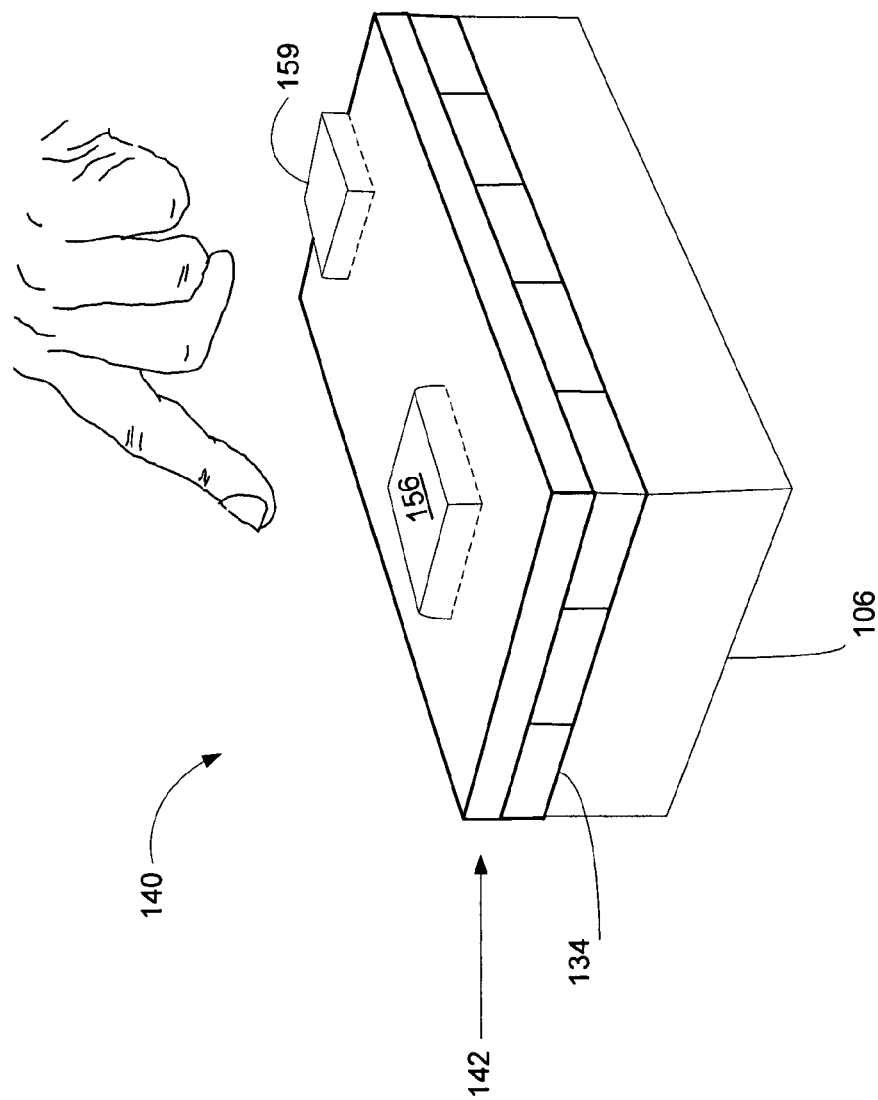

FIG. 1(c) shows a 3D diagram illustrating a haptic device 140 using a haptic substrate and a flexible surface in accordance with one embodiment of the present invention. Device 140 includes a flexible surface 142, a haptic substrate 134, and a deforming mechanism 106. It should be noted that haptic substrate 134 and deforming mechanism 106 are the same or substantially the same elements. It should be further noted that the underlying concept of the exemplary embodiment of the present invention would not change if additional blocks were added to or removed from device 140.

When deforming mechanism 106 is activated, flexible surface 142 collapses over haptic substrate 134, which, as illustrated in FIG. 1(b), has two activated tactile regions 136 and 139, to form two bumps 156 and 159. Bumps 156 and 159, in one example, imitate two buttons. For example, haptic substrate 134 is capable of detecting a contact on button 156 or 159 and providing a haptic feedback to confirm which button had been depressed. Alternatively, haptic substrate 134 is capable of generating one of many unique physical patterns in response to one or more signals. As such, flexible surface 102 can be reconfigured to different patterns in accordance with the pattern or patterns provided by haptic substrate 134. The surface texture of flexible surface can be configured to a telephone key pad, a calculator buttons, computer key pad, radio panel, PDA interfaces, or the like.

Figure 1D:
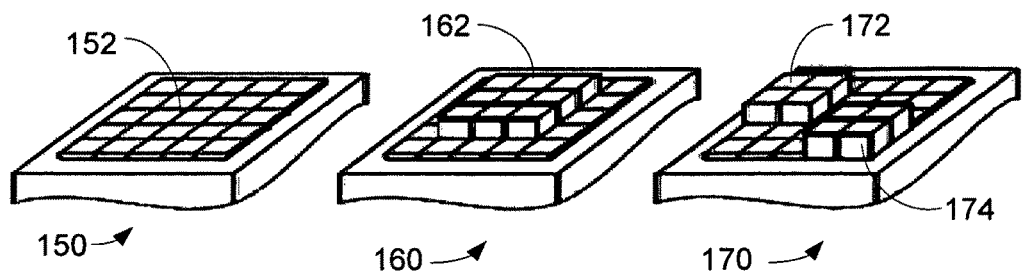

FIG. 1(d) shows examples of haptic substrates 150-170 illustrating different patterns generated by haptic effect in accordance with one embodiment of the present invention. Substrate 150 illustrates an array of tactile regions 152 wherein each region can be independently controlled and activated. Substrate 160 illustrates that nine (9) tactile regions 162 situated in the mid-section of substrate 160 are activated and raised. Also, two sections 172-174 of haptic substrate 170 have been raised to provide a different surface pattern. It should be noted that various different patterns can be generated from the array of tactile regions in response to the various control signals. It should be further noted that substrate can change over time, which causes flexible surface 102 to change as well.

Figure 1E:
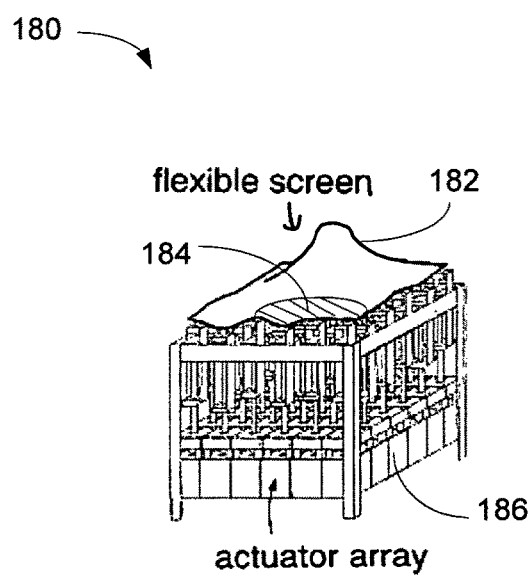
Figure 2A:
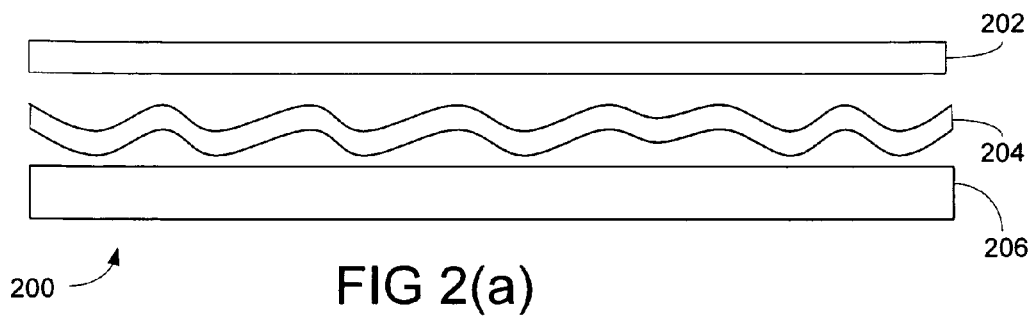
FIGS. 2(a-d) illustrate cross-section diagrams illustrating a haptic device having a deformable surface in accordance with one embodiment of the present invention.
Figure 2B:
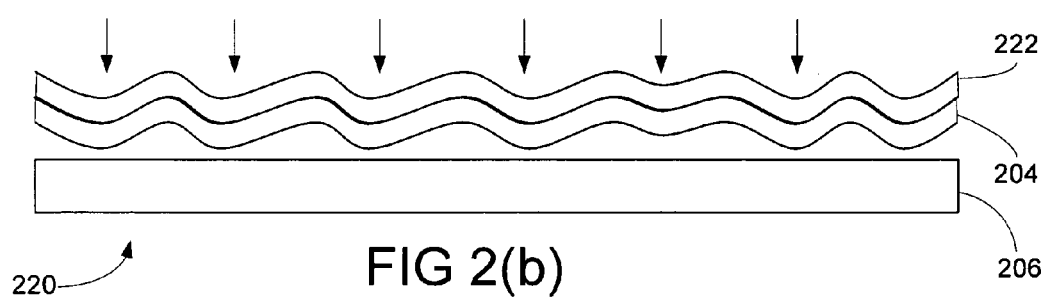
Figure 2C:
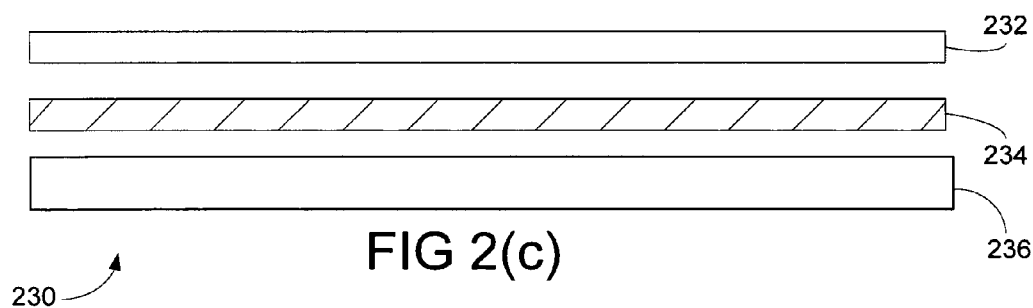
Figure 2D:
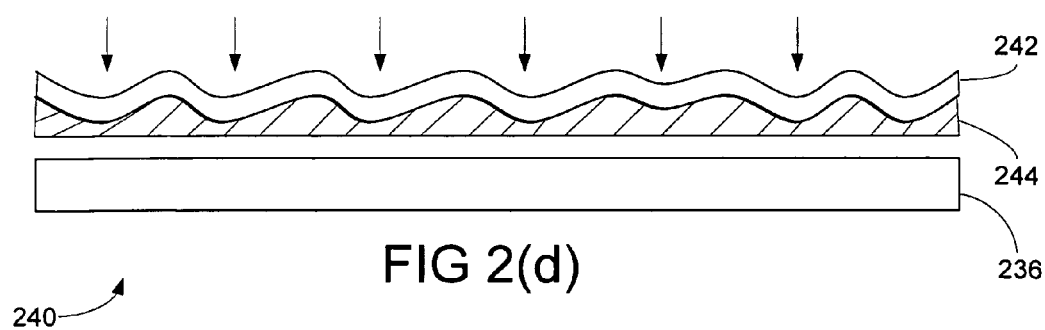
Figure 3A:
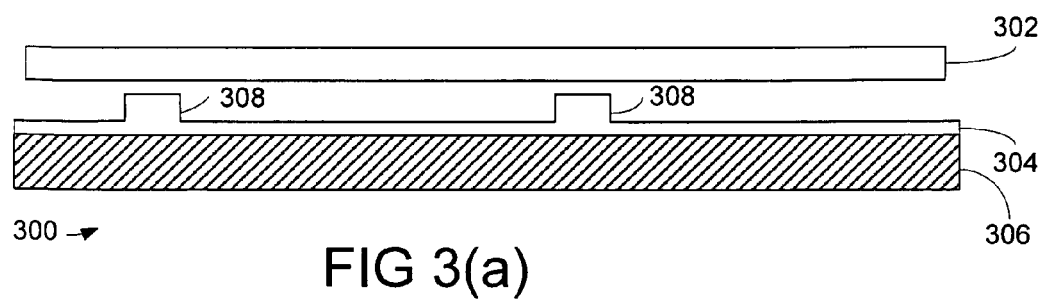
FIGS. 3(a-f) illustrate cross-section diagrams illustrating alternative examples of a haptic device using a deformable surface in accordance with one embodiment of the present invention.
Figure 3B:
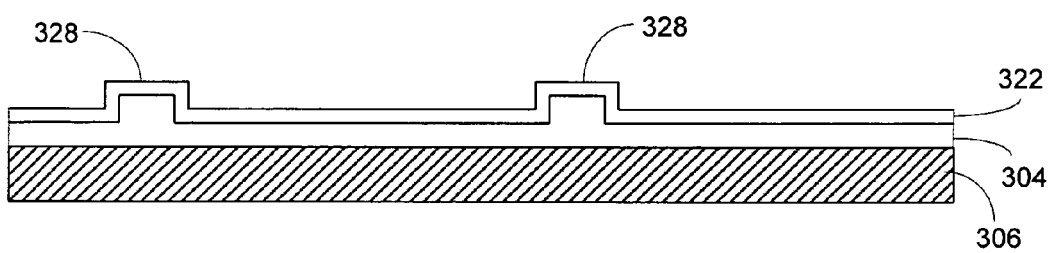
Figure 3C:
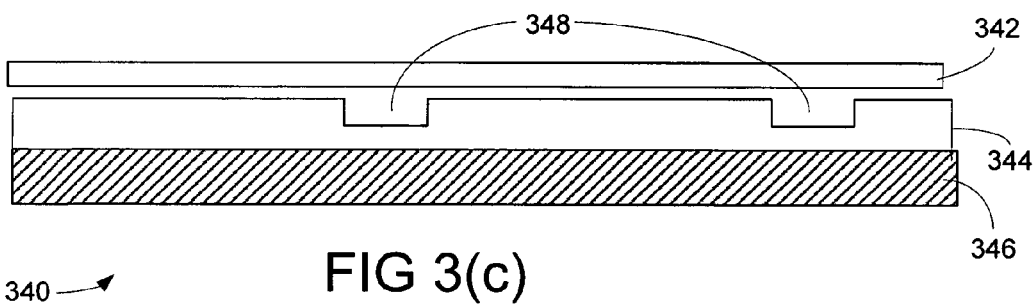
Figure 3D:
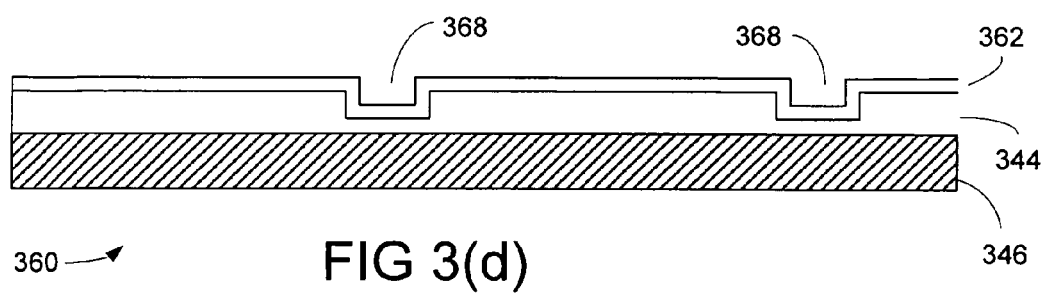
Figure 3E:
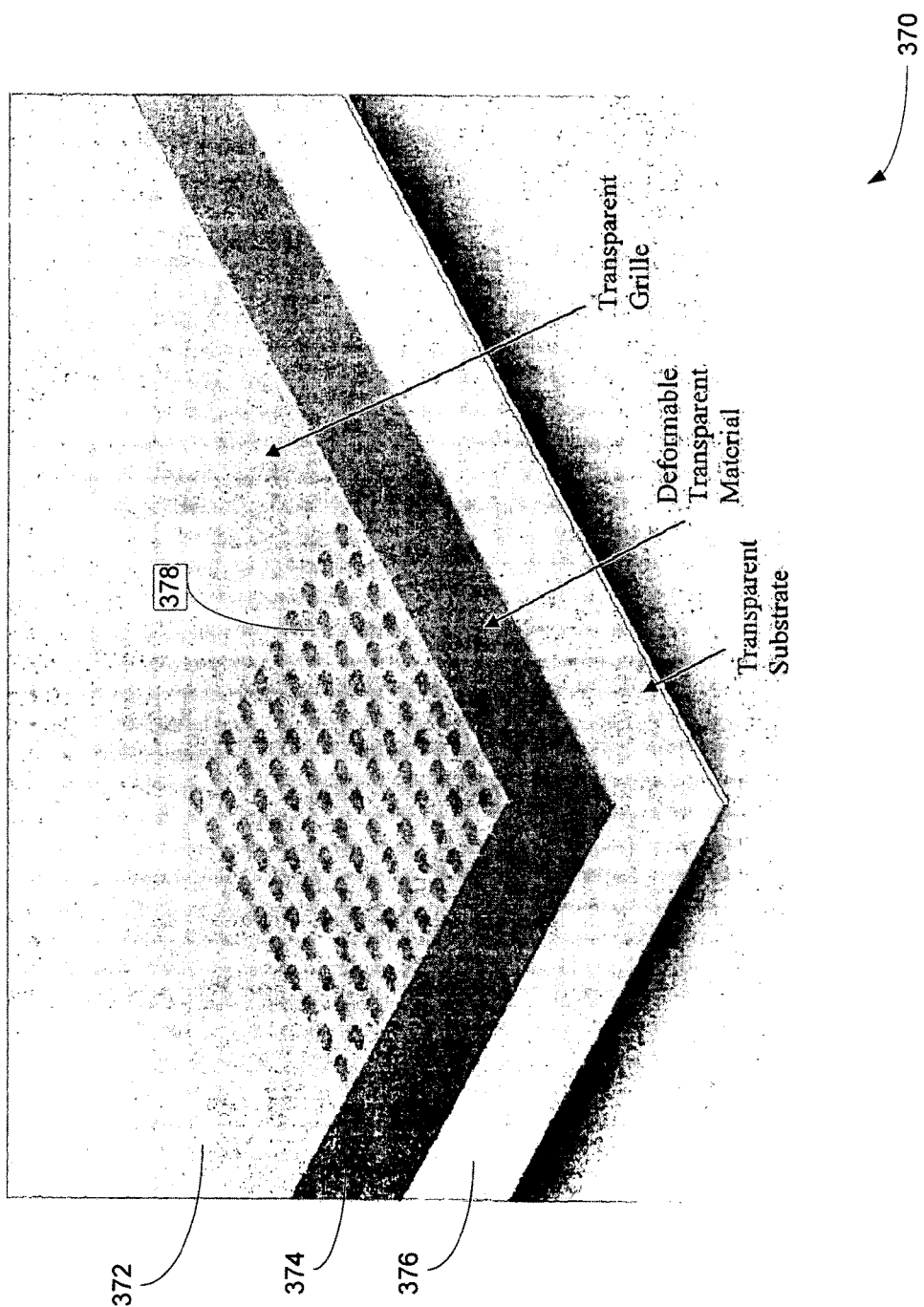
Figure 3F:
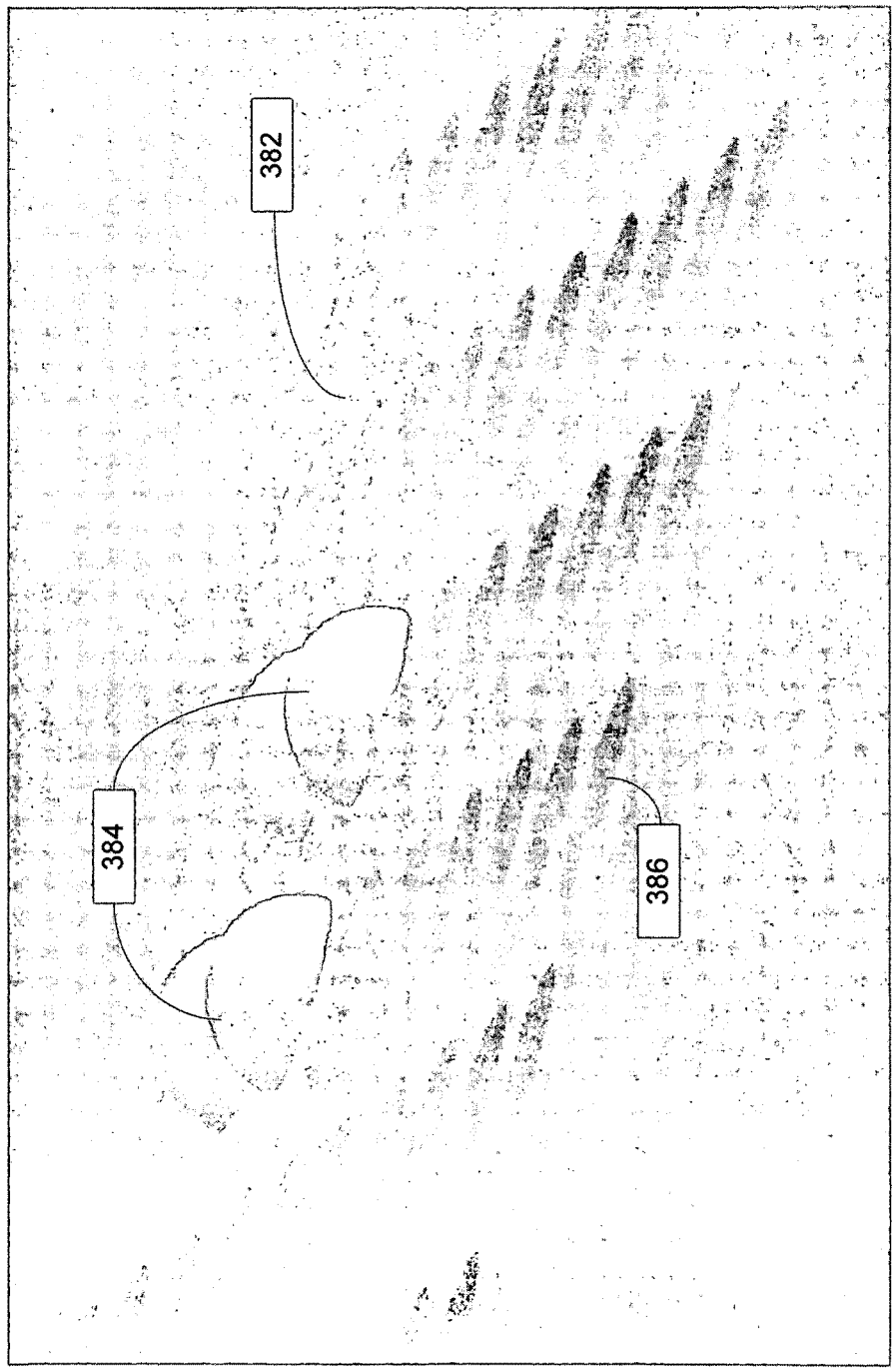

FIG. 1(e) illustrates a haptic device 180 using haptic substrates and flexible surfaces in accordance with one embodiment of the present invention. Device 180 includes a flexible screen and an array of actuator 186 wherein the flexible screen is capable of combining haptic sensation with computer graphics. The flexible screen, for example, illustrates the terrain and/or texture of a mountain 182 as well as a watery sensation or texture of a lake 184. When a computer displays a graphical representation of a mountain terrain and a lake, device 180 provides realistic sensation of mountain terrain for the mountain and watery texture for the lake. For example, a user feels watery sensation when he or she touches lake 184 or feels rocky sensation if he or she touches mountain 182. When the computer, however, displays another graphical representation, such as a beach, device 180 will change its surface characteristic to illustrate the beach or sandy sensation. It should be noted that haptic substrate 104 may be used to replace actuator array 186 in device 180.

FIGS. 2(a-b) show cross-section diagrams 200-220 illustrating a haptic texture device having a deformable surface in accordance with one embodiment of the present invention. Diagram 200 includes a flexible or deformable surface 202, a predefined substrate 204, and a deforming mechanism 206. In one embodiment, diagram 200 includes a display, not shown in FIGS. 2(a-b), which can be a liquid crystal display ("LCD") or other type of flat panel displays capable of displaying images viewable by a user. It should be noted that the underlying concept of the exemplary embodiment of the present invention would not change if one or more layers were added to diagram 200 or 220.

Diagram 200 shows a situation in which deforming mechanism 206 is not activated and flexible surface 202 maintains its natural smooth surface floating on top of substrate 204. Diagram 220 shows a situation in which deforming mechanism 206 is activated and flexible surface 222 collapses onto predefined substrate 204 to mold surface 222 to a pattern provided by substrate 204. Accordingly, flexible surface 202 changes its surface configuration from a smooth configuration to a coarse configuration in accordance with the state of deforming mechanism 206. In another embodiment, substrate 204 and deforming mechanism 206 are combined into one haptic layer, which provides surface patterns as well as deformation function.

Predefined tactile substrate 204, in one embodiment, can be reshaped or re-patterned with the addition of a haptic control mechanism that allows for the raising or lowering of specific areas of the tactile substrate surface. Transformation of the substrate surface can be accomplished by using haptic devices, such as piezoelectric materials, Micro-Electro-Mechanical Systems ("MEMS") elements, thermal fluid pockets, MEMS pumps, resonant devices, variable porosity membranes, laminar flow modulation, or the like. Reshaping or re-patterning of the substrate, in one embodiment, allows unlimited surface shapes or textures, such as raised edges imitating virtual buttons or sliders, or centering detents imitating virtual keypads.

FIGS. 2(c-d) show cross-section diagrams 230-240 illustrating an alternative example of a haptic device having a deformable surface in accordance with one embodiment of the present invention. Diagram 230 includes a flexible or deformable surface 232, a haptic substrate 234, and a deforming mechanism 236. Diagram 230 shows a situation in which deforming mechanism 236 is not activated and flexible surface 232 maintains its natural smooth surface. Upon activation, haptic substrate 244 generates a pattern similar to the pattern provided by predefined substrate 204. Haptic substrate 244, in one embodiment, uses haptic feedback to generate a pattern(s). Haptic feedback can also be referred to as tactile effect, tactile feedback, haptic effect, force feedback, or vibrotactile feedback.

Diagram 240 shows a situation in which deforming mechanism 236 is activated and flexible surface 242 collapses onto haptic substrate 244 to mold its surface to a pattern provided by substrate 244. Accordingly, flexible surface 242, in one embodiment, changes its surface configuration from a smooth configuration to a coarse configuration in response to the state of deforming mechanism 236. Pattern(s) generated by haptic substrate 244 alters the texture of flexible surface 242. It should be further noted that flexible surface 202 or 232 or 242 may be touch-sensitive surface that is capable of accepting an input(s) from a user. In another embodiment, haptic substrate 244 and deforming mechanism 236 are combined into one haptic layer, which is capable of providing unique patterns as well as surface deformation.

The types of textures may include, but are not limited to, varying degrees of rough and smooth or hard and soft or hot and cold textures. The textures may be applied to, but are not limited to, virtual objects or virtual surfaces, such as feeling an image of sandpaper and/or corduroy or interactions, such as dragging, pulling, pushing, pinching, expanding, erasing, drawing, etc. It should be appreciated that various types of textures provided by haptic systems can be controllable and customizable textures to touch surfaces. In another embodiment, the haptic device or system also provides confirmative actuation to user for confirming interactions, such as activating, navigating and/or controlling virtual buttons, switches and/or sliders.

FIGS. 3(a-b) show cross-section diagrams 300-320 illustrating alternative examples of a haptic device using a deformable surface in accordance with one embodiment of the present invention. Diagram 300 includes a flexible or deformable surface 302, a predefined substrate 304, and a deforming mechanism 306, wherein predefined substrate 304 includes bumps 308. In one embodiment, diagram 300 includes a display, not shown in FIGS. 3(a-b), which can be a LCD or other type of flat panel displays capable of displaying images viewable by a user. It should be noted that the underlying concept of the exemplary embodiment of the present invention would not change if one or more layers were added to diagram 300 or 320.

Diagram 300 shows a situation in which deforming mechanism 306 is not activated and flexible surface 302 maintains its natural smooth surface floating on top of substrate 304. Diagram 320 shows a situation in which deforming mechanism 306 is activated and flexible surface 322 collapses onto predefined substrate 304 to mold surface 322 to a pattern provided by substrate 304. Accordingly, flexible surface 322 changes its surface configuration from a smooth configuration to a coarse configuration with bumps 328. In another embodiment, substrate 304 and deforming mechanism 306 are combined into one haptic layer, which is capable of providing surface patterns as well as deformation function.

FIGS. 3(c-d) show cross-section diagrams 340-360 illustrating alternative examples of a haptic device using a deformable surface in accordance with one embodiment of the present invention. Diagram 340 includes a flexible or deformable surface 342, a predefined substrate 344, and a deforming mechanism 346, wherein predefined substrate 344 includes indentations 348. Diagram 340 shows a situation in which deforming mechanism 346 is not activated and flexible surface 342 maintains its natural smooth surface floating on top of substrate 344. Diagram 360 shows a situation in which deforming mechanism 346 is activated and flexible surface 362 collapses onto predefined substrate 344 to mold surface 362 to a pattern provided by substrate 344. Accordingly, flexible surface 362 changes its surface configuration from a smooth configuration to a coarse configuration with indentations 368. In another embodiment, substrate 344 and deforming mechanism 346 are combined into one haptic layer, which is capable of providing patterns as well as deformation.

It should be noted that a predefined textured substrate under a deformable surface can conform or not conform by varying input energy or signals. For example, when vacuum chamber is created between the layers or objects, the space around the object is collapsed to a point in which the surface conforms to the shape of the underlying object. It should be further noted that the deformation of the surface can occur across the entire surface for a uniform texture, or can occur at multiple-touch points by sending varying, controlled input energy to substrate material. Different textures can be generated across multiple-touch points. For example, a user dragging two fingers across the touch surface may feel a smooth texture with one finger while feeling a rough texture with the other.

FIGS. 3(*e-f*) show 3D diagrams 370-380 illustrating an alternative example of a haptic device using a deformable surface in accordance with one embodiment of the present invention. Diagram 370 includes a predefined transparent grille 372, a flexible or deformable transparent material 374, and a transparent substrate 376, wherein grille 372 includes multiple openings 378. In one embodiment, diagram 370 includes a display, not shown in FIGS. 3(*e-f*), which can be a LCD or other flat panel display capable of displaying images viewable by a user. It should be noted that the underlying concept of the exemplary embodiment of the present invention would not change if one or more layers were added to diagram 370 or 380.

Diagram 370 shows a situation in which transparent substrate 376 is not activated and deformable transparent material 374 maintains its natural state situated between grille 372 and substrate 376. Diagram 380 shows a situation in which deforming mechanism or substrate 376 is activated and deformable materials 374 is being pushed partially through the openings or holes 386 of grille 382 to form "machine-made goosebumps" 384. As such, the surface of grille 372 changes its surface configuration from a coarse configuration with indentations 378 to a minibumps (goosebumps) configuration. In another embodiment, substrate 374 and deformable material 374 are combined into one haptic layer, which is capable of providing patterns as well as deformation.

Haptic substrates and/or haptic mechanisms as described above are used to control texture of a flexible surface. A combination of different haptic substrates and/or mechanisms can also be used in a haptic user interface device to achieve the best haptic results. The following embodiments illustrated by FIG. 4 through FIG. 8 are additional examples of haptic devices or haptic actuators that can be used to generate haptic feedback for controlling surface texture as well as input confirmation.

FIG. 4(*a*) illustrates a tactile or haptic region 410 using piezoelectric materials to generate haptic effects in accordance with one embodiment of the present invention. Region 410 includes an electrical insulated layer 402, a piezoelectric material 404, and wires 406. Electrical insulated layer 402 has a top surface and a bottom surface, wherein the top surface is configured to receive inputs. A grid or an array of piezoelectric materials 404 in one embodiment is constructed to form a piezoelectric or haptic layer, which also has a top and a bottom surface. The top surface of the piezoelectric layer is situated adjacent to the bottom surface of electrical insulated layer 402. Each region 410 includes at least one piezoelectric material 404 wherein piezoelectric material 404 is used to generate haptic effects independent of other piezoelectric region 410 in piezoelectric layer. In one embodiment, multiple adjacent or neighboring regions 410 are capable of generating multiple haptic effects in response to multiple substantially simultaneous touches. In another embodiment, each of regions 410 has a unique piezoelectric material thereby it is capable of initiating a unique haptic sensation.

It should be noted that a tactile touch panel, which includes an electrical insulated layer 402 and a piezoelectric layer, in some embodiments further includes a display, not shown in the figure. This display may be coupled to the bottom surface of the piezoelectric layer and is capable of projecting images that are viewable from the top surface of electrical insulated layer 402. It should be noted that the display can be a flat panel display or a flexible display. Piezoelectric materials 404, in one embodiment, are substantially transparent and small. The shape of piezoelectric material 404, for example, deforms in response to electrical potentials applied via electrical wires 406.

During a manufacturing process, a piezoelectric film is printed to include an array or a grid of piezoelectric regions 410. In one embodiment, a film of regions 410 containing piezoelectric materials is printed on a sheet in a cell grid arrangement. The film further includes wirings for directly addressing every region 410 in the device using electrical control signals. Region 410, for example, can be stimulated using edge or back mounted electronics. Piezoelectric materials may include crystals and/or ceramics such as quartz ($SiO_2$).

FIG. 4(*b*) illustrates a tactile or haptic region 410 generating haptic effects in accordance with an embodiment of the present invention. During operation, when a voltage potential applies to piezoelectric material 405 via wires 406, piezoelectric material 405 deforms from its original shape of piezoelectric material 404, as shown in FIG. 4(*a*), to expanded shape of piezoelectric material 405. Deformation of piezoelectric material 405 causes electrical insulated layer 403 to deform or strain from its original state of layer 402, as shown in FIG. 4(*a*). In an alternative embodiment, piezoelectric materials 405 return to its original state as soon as the voltage potential is removed. It should be noted that the underlying concept of the present invention does not change if additional blocks (circuits or mechanical devices) are added to the device illustrated in FIG. 4(*a-b*). If the piezoelectric material is replaced with other materials such as shape memory alloys ("SMAs"), such material may be capable of maintaining its deformed shape for a period of time after the voltage potential is removed. It should be noted that the underlying concept of the embodiments of the present invention does not change if different materials other than piezoelectric actuators are employed. As such a grid of piezoelectric actuators may be used to control the surface texture of touch-sensitive surface of the interface device.

FIG. 4(*c*) is a diagram 450 illustrating another embodiment of a tactile or haptic region or cell 410 using Micro-Electro-Mechanical Systems ("MEMS") device 452 to generate haptic effects in accordance with one embodiment of the present invention. Diagram 450 depicts a block 460, which shows a top view of cell 410. Cell 410 includes a MEMS device 452. In one embodiment, MEMS device 452 is substantially transparent thereby the image projection from a display, not shown in FIG. 4(*c*), can be viewed through block 460. It should be noted that each of haptic cells 410 is coupled to at least one wire to facilitate and generate haptic effects.

MEMS can be considered as an integration of mechanical devices, sensors, and electronics on a silicon or organic semiconductor substrate, which can be manufactured through conventional microfabrication process. For example, the electronic devices may be manufactured using semiconductor fabrication process and micromechanical devices may be fabricated using compatible microfabrication process. In one embodiment, a grid or an array of MEMS devices 452 are made of multiple cantilever-springs. A grid of cantilever-springs can be etched using MEMS manufacturing techniques. Also, electrical wirings for stimulating or driving cantilever-springs can also be directly etched onto the surface of the MEMS device 452 thereby every single MEMS device can be correctly addressed. MEMS cantilevers can be stimulated using a resonant drive (for vibrotactile) or direct actuation (kinesthetic).

FIG. 4(*d*) illustrates a side view of MEMS device 452, wherein MEMS device 462 can be stimulated or deformed from its original state of MEMS device 452 to deformed state of MEMS device 464 when a voltage potential across MEMS device is applied. Displacement 454 between the original state and the deformed state depends on the composition of materials used and the size of MEMS device 452. Although smaller MEMS devices 452 are easier to fabricate, they offer smaller displacement 454. In one embodiment, cantilever-springs can be made of piezo materials. It should be noted that the actuation of piezo material is generally vibrotactile sensation. It should be further noted that piezo material can be used as a sensor for sensing fingertip positions and depressions.

MEMS device 452, in another embodiment, uses shape memory alloy ("SMA") in place of cantilever-spring as mentioned above. The actuation generated by MEMS device 452 using SMA provides kinesthetic actuation. SMA, also known as memory metal, could be made of copper-zinc-aluminum, copper-aluminum-nickel, nickel-titanium alloys, or a combination of copper-zinc-aluminum, copper-aluminum-nickel, and/or nickel-titanium alloys. Upon deforming from SMA's original shape, SMA regains its original shape in accordance with an ambient temperature and/or surrounding environment. It should be noted that the present invention may combine piezoelectric elements, cantilever-spring, and/or SMA to achieve a specific haptic sensation. As such, a grid of MEMS device 452 may be used to control the surface texture of touch-sensitive surface of the interface device.

Figure 5A:
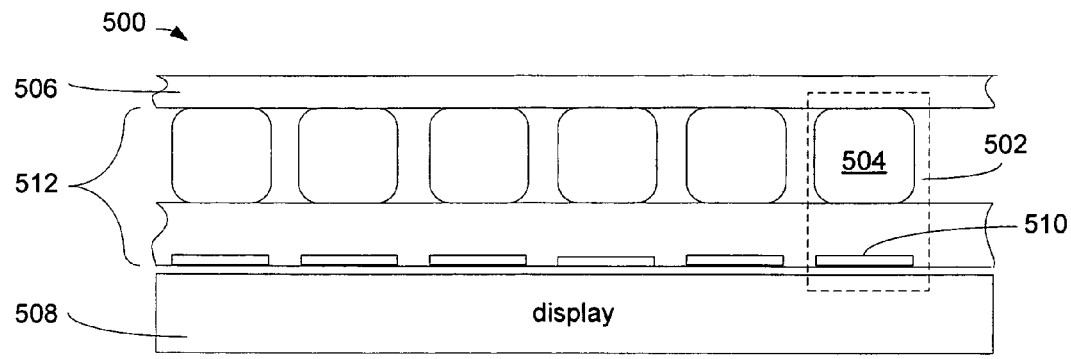
FIG. 5(a-b) illustrates a side view of a haptic device having an array of haptic cells with thermal fluid pockets in accordance with one embodiment of the present invention.
Figure 5B:
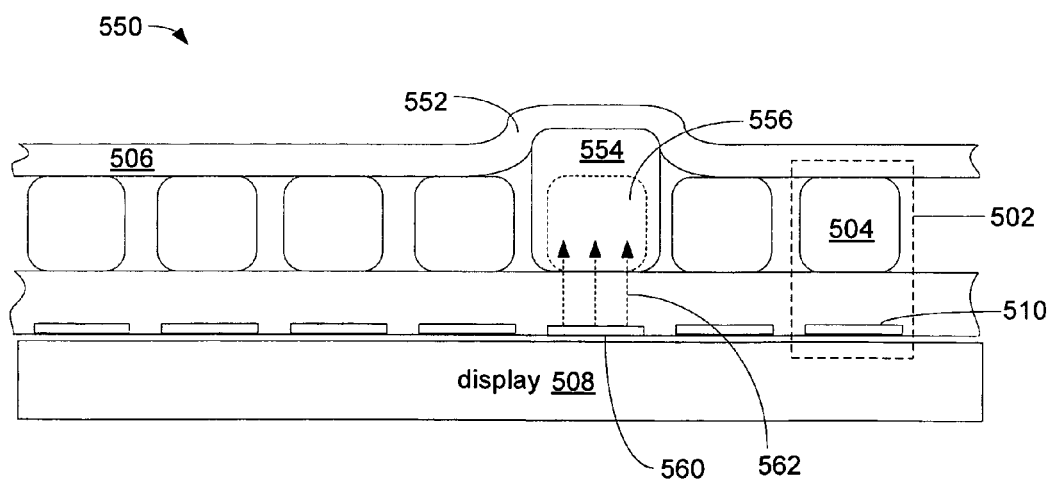

FIG. 5(*a*) is a side view diagram of an interface device 500 illustrating an array of haptic cells or tactile region 502 with thermal fluid pockets 504 in accordance with one embodiment of the present invention. Device 500 includes an insulated layer 506, a haptic layer 512, and a display 508. While the top surface of insulated layer 506 is capable of receiving inputs from a user, the bottom surface of insulated layer 506 is placed adjacent to the top surface of haptic layer 512. The bottom surface of haptic layer 512 is placed adjacent to display 508, wherein haptic layer 512 and insulated layer 506 may be substantially transparent thereby objects or images displayed in display 508 can be seen through haptic layer 512 and insulated layer 506. It should be noted that display 508 is not a necessary component in order for the interface device to function.

Haptic layer 512, in one embodiment, includes a grid of fluid filled cells 502, which further includes at least one thermal fluid pocket 504 and an associated activating cell 510. It should be noted that each of fluid filled cells 502 can include multiple thermal fluid pockets 504 and associated activating cells 510. In another embodiment, a fluid filled cell 502 includes multiple associated or shared activating cells 510 thereby initiating a different activating cell generates a different haptic sensation(s).

Activating cell 510, in one embodiment, is a heater, which is capable of heating an associated thermal fluid pocket 504. Various electrical, optical, and mechanical techniques relating to heating technology can be used to fabricate activating cells 510. For example, various electrically controlled resistors can be used for activating cells 510, wherein resistors can be implanted in haptic layer 512 during the fabrication. Alternatively, optical stimulators such as infrared lasers can be used as activating cells 510 to heat up thermal fluid pockets 504. Optical stimulator, for example, can be mounted at the edge of the interface device. It should be noted that activating cells 510 can be any types of optical or radioactive stimulator as long as it can perform the function of a heating device. Activating cells 510 may also include rear mounted thermal stimulators, which are similar technologies like hot plasma displays such as are commonly found in flat panel plasma televisions.

Device 500 further includes a set of control wires, not shown in FIG. 5(*a*), wherein each of activating cells 510 is coupled to at least one pair of wires. The wires are configured to transmit activating/deactivating control signals, which are used to drive activating cells 510. It should be noted that each of fluid filled cells 502 is addressable using signals from wires or wireless networks. Display 508, in one aspect, can be a flat panel display or a flexible display. In an alternative embodiment, the physical location of display 508 is exchangeable with haptic layer 512. Also, thermal fluid pockets 504, in one embodiment, can be activated by a piezoelectric grid.

Thermal fluid pockets 504, in one embodiment, include fluid with physical properties of low specific heat and high thermal expansion. Examples of this fluid include glycerin, ethyl alcohol, or the like. Thermal fluid pockets 504 are capable of producing multiple localized strains in response to multiple touches received by insulated layer 506. Each localized strain is created by a heated thermal fluid pocket 504 wherein the heat is generated by an associated activating cell 510. In one embodiment, a thermal fluid pocket 504 changes its physical shape in accordance with the temperature of the fluid in the pocket. In another embodiment, fluid filled cell 502 has an active cooling system, which is used to restore the expanded shape of thermal fluid pocket 504 to its original shape after it is deactivated. The control of fluid temperature affects haptic bandwidth. Rapid rising of fluid temperature and fast heat dissipation of fluid enhance haptic bandwidth of thermal fluid packets.

The physical size of each fluid cell 502 can also affect the performance of the cell for generating haptic sensation(s). For example, if the size of fluid cell 504 is smaller than ½ fingertip, the performance of cell 504 enhances because smaller cell permits rapid heat dissipation as well as quick temperature rising of fluid in the cell. In another embodiment, thermal plastic pockets filled with plastic fluid are used in place of thermal fluid pockets 504 filled with thermally sensitive fluid to enhance the haptic effects. Using thermal plastic pockets filled with plastic-like fluid can produce high thermal plastic strain. For example, a type of plastic fluid is polyethylene. Thermal plastic pockets can also provide different and unique haptic sensations to the user. In another embodiment, some exotic fluids such as electrorheological and/or magnetorheological fluid can be used in place of thermal fluid in thermal fluid pockets 504. Thermal fluid pockets 504 filled with electrorheological fluid can be stimulated by a local or remote electrical field, while thermal fluid pockets 504 filled with magnetorheological fluid can be stimulated by a local or remote magnetic field.

FIG. 5(*b*) is a side view diagram for an interface device 550 illustrating an array of haptic cells 502 using thermal fluid pockets 554 in accordance with one embodiment of the present invention. Device 550 also shows an activated thermal fluid pocket 554 and an activated activating cell 560. During the operation, thermal fluid pocket 554 increases its physical volume (or size) from its original state 556 to expanded thermal fluid pocket 554 when activating cell 560 is activated. When activating cell 560 is activated, it provides heat 562 to thermal fluid pocket 554 or 556 to expand the size of thermal fluid pocket 554 or 556. Due to the expansion of thermal fluid pocket 554, a localized portion 552 of insulated layer 506 is created. As soon as the temperature of the fluid in the thermal fluid pocket 554 cools down, the size of thermal fluid pocket 554 returns to its original state 556. The change of size between original size of a thermal fluid pocket 556 and expanded size of thermal fluid pocket 554 generates a haptic effect. It should be noted that activating cell 560 could be an electric heater or an optical heater such as an infrared simulator. As such, an array of haptic cells using thermal fluid pockets 552 may be used to control the surface texture of touch-sensitive surface of the interface device.

Figure 6:
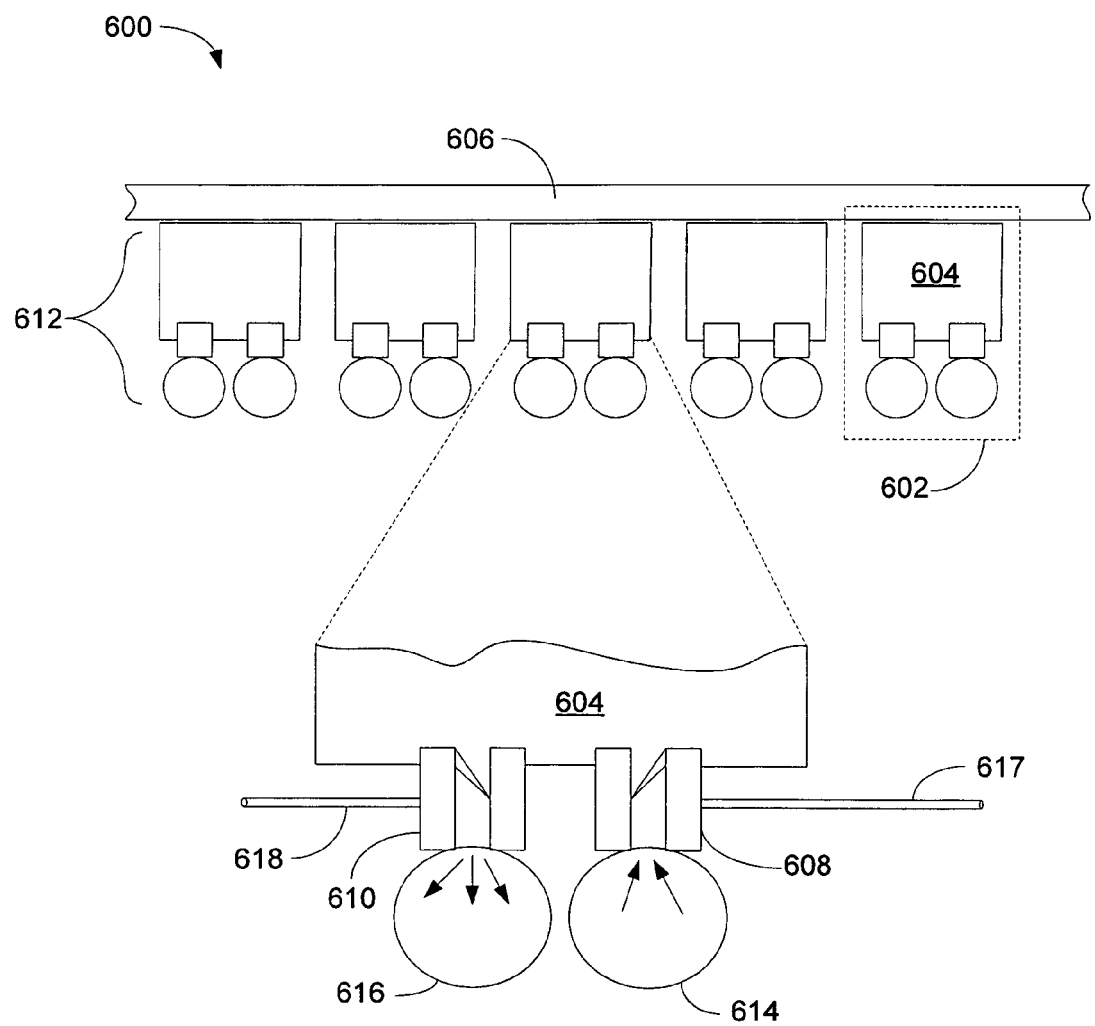
FIG. 6(a-b) illustrates a haptic cell employing Micro-Electro-Mechanical Systems pumps to generate haptic effects in accordance with one embodiment of the present invention.
Figure 6B:
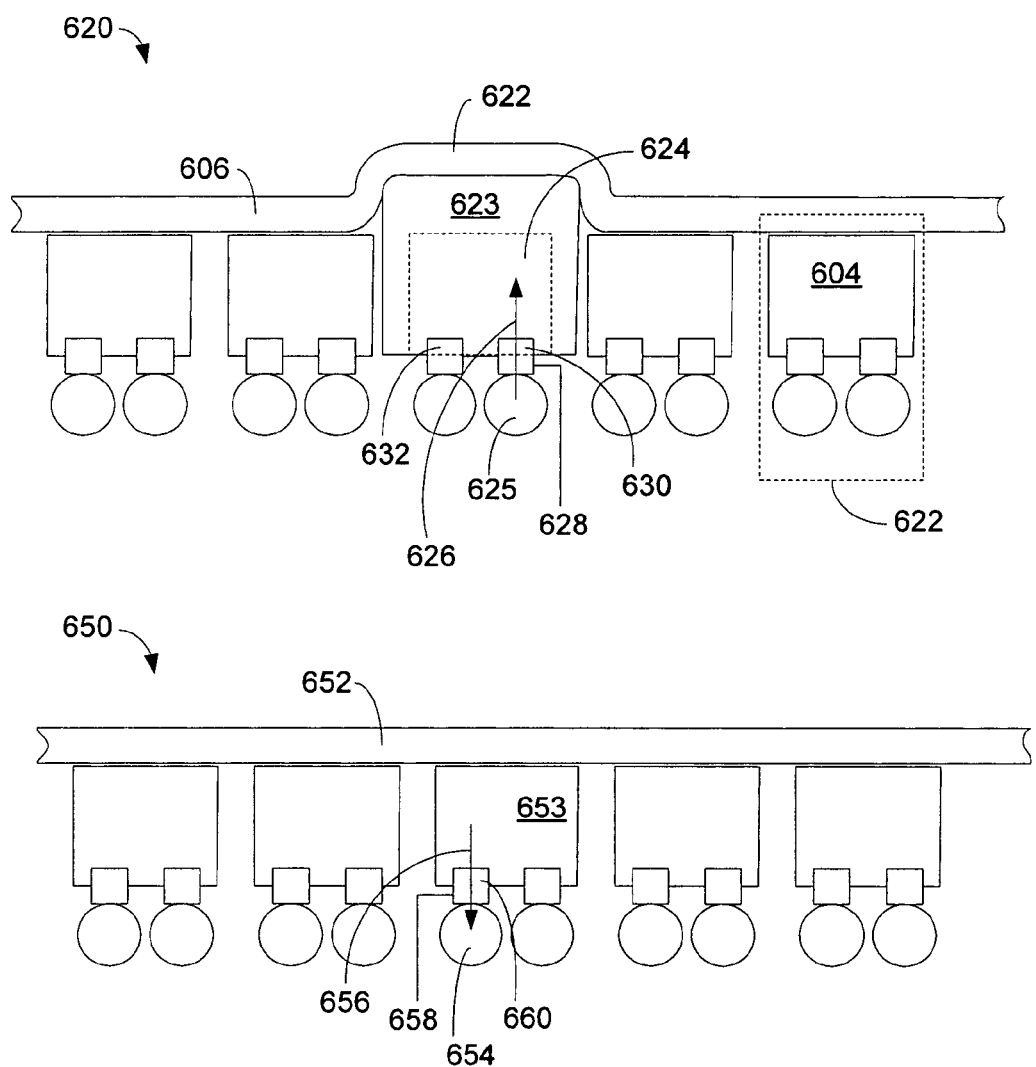

FIG. 6(*a*) is a side view diagram of an interface device 600 illustrating an array of MEMS pumps 602 in accordance with one embodiment of the present invention. The array of MEMS pumps 602 can be used to implement tactile regions for controlling surface textures. Diagram 600 includes an insulated layer 606 and a haptic layer 612. While the top surface of insulated layer 606 is configured to receive a touch or touches from a user, the bottom surface of insulated layer 606 is placed adjacent to the top surface of haptic layer 612. The bottom surface of haptic layer 612 is, in one embodiment, placed adjacent to a display (not shown in FIG. 6(*a*)), wherein haptic layer 612 and insulated layer 606 may be substantially transparent thereby objects or images displayed in the display can be seen through haptic layer 612 and insulated layer 606. It should be noted that display is not a necessary component in order for the interface device to function.

Haptic layer 612, in one embodiment, includes a grid of MEMS pumps 602, which further includes at least one pocket 604. Each MEMS pump 602 includes a pressurized valve 608 and a depressurized valve 610. Pressurized valve 608 is coupled to an inlet tube 614 while depressurized valve 610 is coupled to an outlet tube 616. In one embodiment, inlet tube 614, which is under high liquid pressure, is used to pump liquid through pressurized valve 608 to expand pocket 604. Similarly, outlet tube 616, which is under low pressure, is used to release the liquid through depressurized valve 610 to release the pressure from pocket 604. It should be noted that MEMS pumps 602 can be coupled to the same pressurized liquid reservoir. It should be further noted that pressurized valve 608 and depressurized valve 610 can be combined into one single valve for both inlet tube 614 and outlet tube 616. It should be further noted that inlet tube 614 and outlet tube 616 can also be combined into one tube.

A grid of MEMS pumps 602 includes an array of pressurized valves 608 and depressurized valves 610, wherein pressurized valves 608 are coupled with a rear or a side mounted liquid reservoir under pressure while depressurized valves 610 are coupled to a rear or a side mounted depressurized liquid reservoir with low pressure. Valves 608-610 control the filling and emptying the liquid pockets 604 in MEMS pumps 602 to produce localized strain. An advantage of using pressurized liquid reservoir is to quickly deform the surface of insulated layer 606 and to maintain the deformation with minimal or no energy consumption (or expenditure). It should be noted that MEMS pump 602 can also use pressurized air or other gases to achieve similar results as liquid.

Device 600 further includes a set of control wires 617-618, which can be used to control pressurized valve 608 and depressurized valve 610, respectively. It should be noted that each valve in haptic layer 612 is addressable using electrical signals transmitted from wires or wireless network.

FIG. 6(*b*) illustrates two diagrams of an interface device 620 and 650 having an array of MEMS pumps 604 in accordance with one embodiment of the present invention. Device 620 illustrates an activated pocket 623, which includes an activated inlet valve 630 and a deactivated outlet valve 632. During an operation, pocket 623 increases its physical volume (or size) from its original state 624 to its expanded pocket 623 when inlet valve 630 is activated. When inlet valve 630 is activated (or open) in response to electrical signal from wire 628, inlet tube 625 pumps liquid 626 from pressurized reservoir to pocket 623. Due to the expansion of pocket 623, a localized strain 622 of insulated layer 606 is created.

Device 650 illustrates an activated MEMS pump returns from its expanded state of pocket 623 to the original state of pocket 653. When depressurized valve 660 is activated, depressurized valve 660 releases liquid 656 from pocket 653 to low pressurized outlet 654. It should be noted that depressurized valve 660 is controlled by at least one control signal via wire 658. The change in volume between original size of pocket 604 and expanded size of pocket 623 generates haptic effects. As such, an array of MEMS pumps 602 may be used to control the surface texture of touch-sensitive surface of the interface device.

Figure 7:
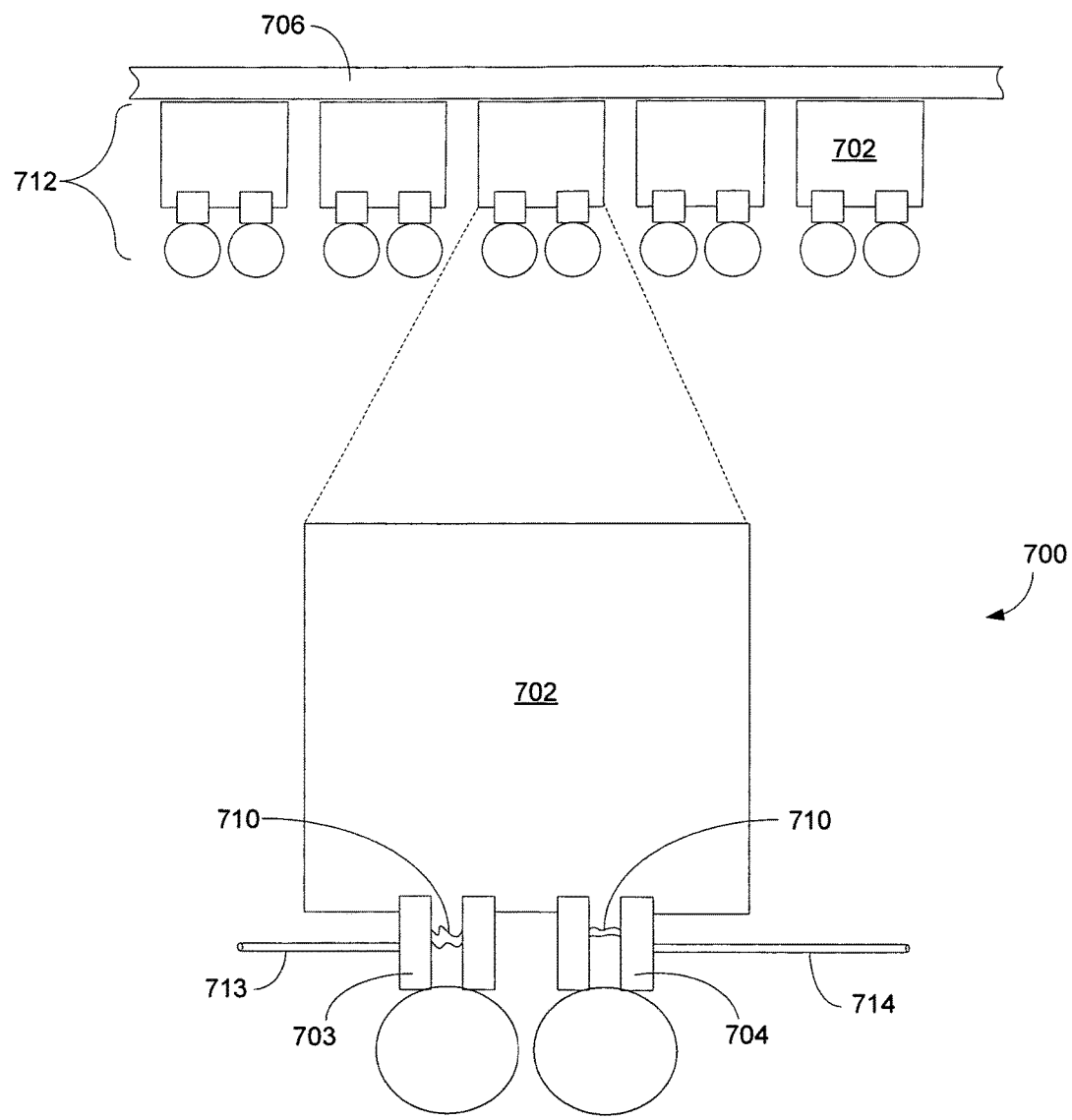
FIG. 7 illustrates a side view diagram for a haptic device having an array of haptic cells using variable porosity membrane in accordance with one embodiment of the present invention.

FIG. 7 illustrates a side view diagram for an interface device 700 having an array of haptic cells 702 using variable porosity membrane 710 in accordance with one embodiment of the present invention. The porosity membrane 710 can be used to implement tactile regions for controlling surface textures. Device 700 includes an insulated layer 706 and a haptic layer 712. While the top surface of insulated layer 706 is configured to receive inputs from a user, the bottom surface of insulated layer 706 is placed adjacent to the top surface of haptic layer 712. The bottom surface of haptic layer 712 is, in one embodiment, placed adjacent to a display (not shown in FIG. 7), wherein haptic layer 712 and insulated layer 706 may be substantially transparent thereby objects or images displayed in the display can be seen through haptic layer 712 and insulated layer 706. It should be noted that display is not a necessary component in order for the interface device to function.

Haptic layer 712, in one embodiment, includes a grid of haptic cells 702, inlet valves 703, and outlet valves 704. Haptic cells 702, in one embodiment, are pockets capable of containing fluid. Haptic layer 712 is similar to haptic layer 612 as shown in FIG. 6(*a*) except that haptic layer 712 employs porosity membranes. While each inlet valve 703 is controlled by control signal(s) transmitted by wire 713, each outlet valve 704 is controlled by electrical signals transmitted over a wire 714. Every inlet valve 703 or outlet valve 704 employs at least one porosity membrane 710. Porosity membranes 710 are coupled (or faced) to a liquid reservoir wherein each membrane 710 is configured to control how much liquid should enter and/or pass through membrane 710. An advantage of using porosity membranes is to maintain the deformation of insulated layer 706 with minimal or no energy consumption. As such, a grid of haptic cells using variable porosity membrane 710 may be used to control the surface texture of touch-sensitive surface of the interface device.

Figure 8:
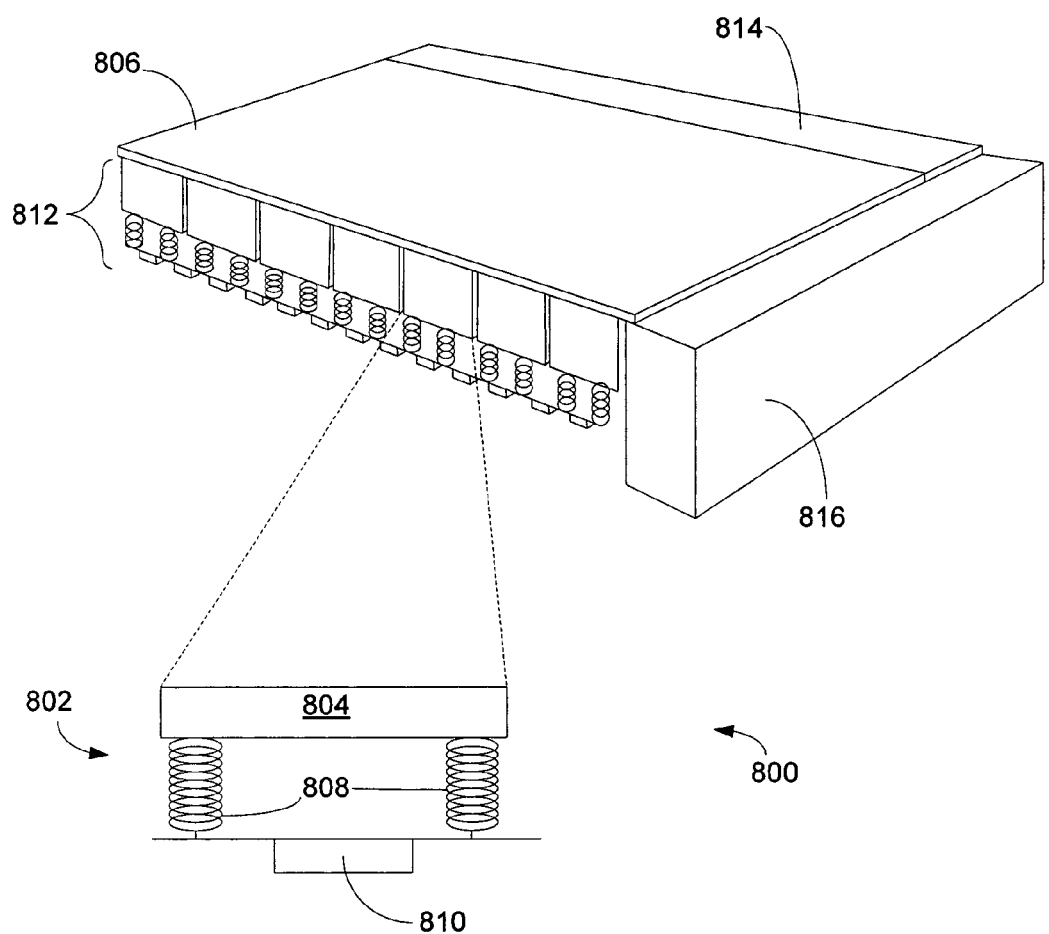
FIG. 8 is a side view of a haptic device having an array of haptic cells using various resonant devices in accordance with one embodiment of the present invention.

FIG. 8 is a side view of an interface device 800 having an array of haptic cells 802 using various resonant devices in accordance with one embodiment of the present invention. The array of haptic cells 802 can be used to implement tactile regions for controlling surface textures. Device 800 includes an insulated layer 806 and a haptic layer 812. While the top surface of insulated layer 806 is configured to receive an input from a user, the bottom surface of insulated layer 806 is placed adjacent to the top surface of haptic layer 812. The bottom surface of haptic layer 812 is, in one embodiment, placed adjacent to a display (not shown in FIG. 8), wherein haptic layer 812 and insulated layer 806 may be substantially transparent thereby objects or images displayed in the display can be seen through haptic layer 812 and insulated layer 806. It should be noted that insulated layer 806 may be flexible whereby it is capable of providing desirable relief information on its surface.

Haptic layer 812, in one embodiment, includes a grid of haptic cells 802, wherein each cell 802 further includes a permanent magnet 804, an electro magnet 810, and two springs 808. Haptic layer 812 is similar to haptic layer 612 shown in FIG. 6(*a*) except that haptic layer 812 employs resonant devices while haptic layer 612 uses MEMS pumps. Haptic cell 802, in one embodiment, uses a resonant mechanical retractable device to generate haptic effects. The resonant mechanical retractable device vibrates in response to a unique frequency, which could be generated by a side mounted resonant stimulator 816 or a rear mounted resonant stimulator 814. A resonant grid, in one embodiment, is used to form a haptic layer 812. Each cell 802 is constructed using resonant mechanical elements such as Linear Resonant Actuator ("LRA") or MEMS springs. Each cell 802, however, is configured to have a slightly different resonant frequency and a high Q (high amplification at resonance and a narrow resonant frequency band). As such, each cell 802 can be stimulated using mechanical pressure waves originating at the edges of the sheet. The haptic effects can also be generated by a piezoelectric or other high bandwidth actuator.

Cell 802, in another embodiment, includes one spring 808. In yet another embodiment, cell 802 includes more than two springs 808. Each spring 808 is configured to respond to a specific range of frequencies thereby each spring 808 can produce a unique haptic sensation. As such, a grid of haptic cells using various resonant devices may be used to control the surface texture of touch-sensitive surface of the interface device. For example, if the displacement of haptic mechanism is sufficiently high such as 200 micrometers or greater, the movement (or tactile vibration) with low frequencies such as 50 Hz or less should sufficiently create desirable relief information.

The exemplary embodiment(s) of the present invention includes various processing steps which will be described below. The steps of the embodiments may be embodied in machine or computer executable instructions. The instructions can be used to cause a general purpose or special purpose system or controller, which is programmed with the instructions, to perform the steps of the embodiment(s) of the present invention.

Figure 9:
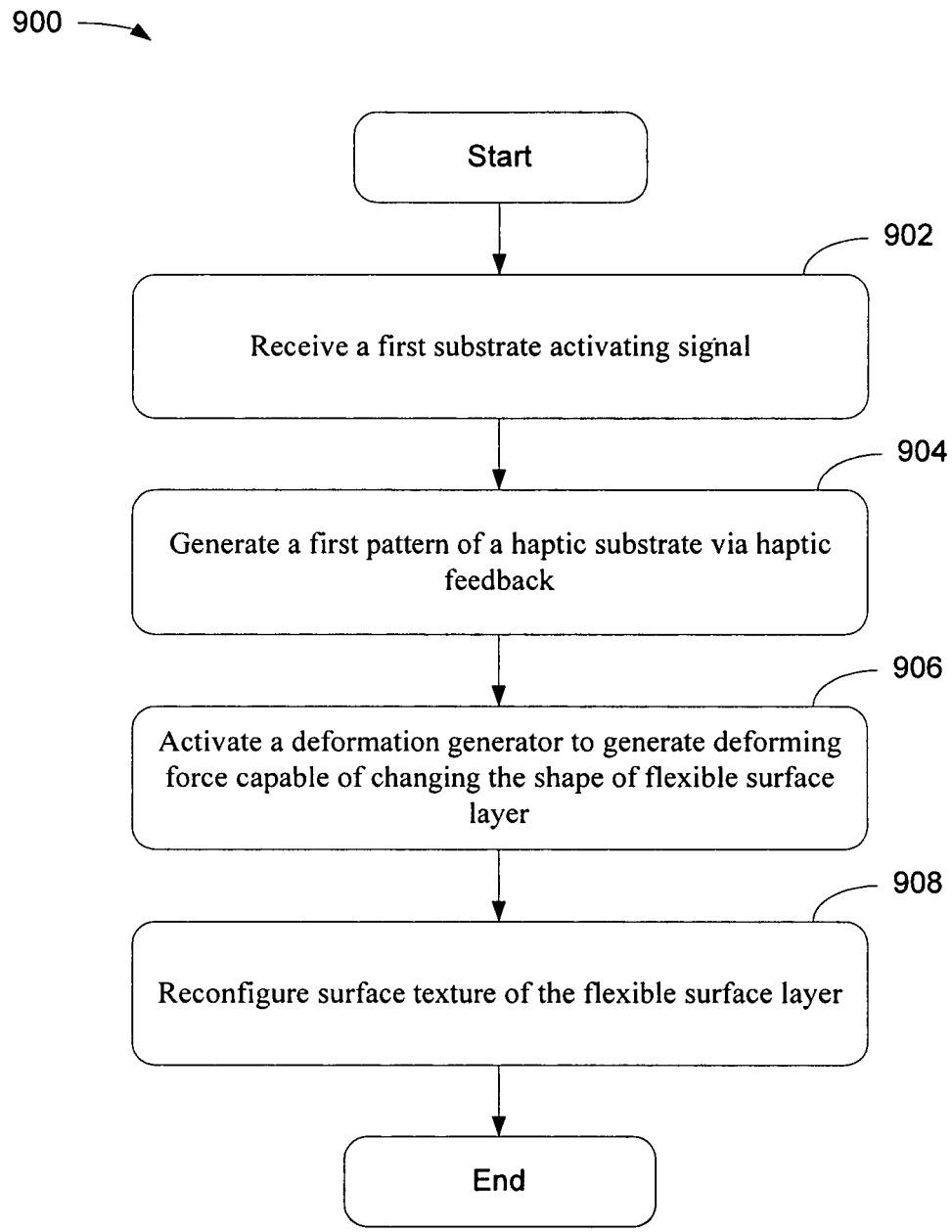
FIG. 9 is a flowchart illustrating a process of providing haptic textures on a deformable haptic surface in accordance with one embodiment of the present invention.

FIG. 9 is a flowchart illustrating a process 900 for providing a haptic device and haptic texture using a deformable surface in accordance with one embodiment of the present invention. At block 902, a process receives a first substrate activating signal. In one embodiment, the first substrate activating signal is used to identify a surface pattern associated with the first substrate. After block 902, the process proceeds to the next block.

At block 904, the process generates a first pattern of a haptic substrate via haptic feedback in response to the first substrate activating signal. In one embodiment, the process selects one of many surface patterns in accordance with the first substrate activating signal. Alternatively, the process activates multiple tactile regions of the haptic substrate independently to create a predefined pattern in response to the first substrate activating signal. After block 904, the process proceeds to the next block.

At block 906, the process activates a deforming generator to generate a force capable of changing the shape of the flexible surface layer. In one embodiment, the process activates a vacuum generator to create a vacuum between the flexible surface layer and the haptic substrate to cause the flexible surface layer to collapse against the first pattern of the haptic substrate. After block 906, the process proceeds to the next block At block 908, the process reconfigures or changes the surface texture of the flexible surface layer from a first surface characterization to a second surface characterization in accordance with the first pattern. In one embodiment, the process pushes the flexible surface layer against the first pattern to confirm the flexible surface layer as the first pattern or the first topography. Upon sensing a contact on the flexible surface, the process, in one embodiment, generates an input signal in response to the contact and sends the input signal to a processing unit. The process is also capable of receiving a user input via a touch on the flexible surface and providing a tactile feedback to confirm the user input. It should be noted that reconfiguring surface texture of the flexible surface layer includes changing from a smooth surface to a coarse surface. In an alternative embodiment, the process is capable of generating a second pattern of a haptic substrate in response to a second activating signal and forcing a flexible surface layer to confirm the second pattern of the haptic substrate. Upon confirmation of the second pattern, the flexible surface changes its surface texture from the second surface characterization to a third surface characterization in response to the second pattern. After block 908, the process ends.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. A haptic device, comprising:
    a flexible surface layer capable of reconfiguring its surface characteristics;
    a haptic substrate coupled to the flexible surface layer and configured to receive a first activating signal and to form a first physical surface pattern in response to the first activating signal, wherein the haptic substrate includes multiple tactile regions, wherein each tactile region is configured to be independently activated to form a surface shape of the haptic substrate; and
    a deforming mechanism coupled to the flexible surface layer and configured to deform the flexible surface layer to a first surface characteristic in accordance with the first physical surface pattern after formation of the first physical surface pattern.

2. The device of claim 1,
    wherein the flexible surface layer comprises a touch-sensitive surface configured to sense a touch on its surface; and
    wherein the haptic substrate is configured to form a second physical surface pattern in response to a second activating signal.

3. The device of claim 2, wherein the haptic substrate is constructed with piezoelectric materials.

4. The device of claim 2, wherein the haptic substrate is constructed by one of micro-electro-mechanical systems ("MEMS") elements, thermal fluid pockets, MEMS pumps, resonant devices, variable porosity membranes, and laminar flow modulation.

5. The device of claim 1, further comprising a sensor configured to activate the device when the sensor detects a touch on the flexible surface.

6. The device of claim 1, wherein the deforming mechanism is further configured to transform the flexible surface layer from a second surface characteristic to the first surface characteristic in response to the first physical surface pattern.

7. The device of claim 1, wherein the haptic substrate is configured to generate a confirmation feedback to confirm an input selection.

8. The device of claim 1, wherein the deforming mechanism is a vacuum generator configured to cause the flexible surface layer to collapse against the first physical surface pattern to form a surface shape in accordance with the first physical surface pattern.

9. The device of claim 1, wherein the flexible surface is part of a flexible surface layer, and wherein the flexible surface layer comprises a flexible display configured to deform with the flexible surface.

10. A method of providing a haptic texture surface, comprising:
    generating a first physical surface pattern with a haptic substrate via haptic feedback in response to a first substrate activating signal received by the haptic substrate, wherein the haptic substrate includes multiple tactile regions, wherein each tactile region is configured to be independently activated to form a physical surface shape of the haptic substrate;
    activating a deforming generator to generate a deforming force to change a shape of a flexible surface layer located above the haptic substrate, subsequent to said generating the first physical surface pattern; and
    reconfiguring a surface texture of the flexible surface layer to change the surface texture from a first surface characterization to a second surface characterization in accordance with the first physical surface pattern generated by the haptic substrate.

11. The method of claim 10, further comprising forcing the flexible surface layer against the first physical surface pattern to conform the flexible surface layer to have a substantially similar topography as the first physical surface pattern.

12. The method of claim 10, further comprising:
    sensing a contact on the flexible surface layer;
    generating an input signal in response to the contact; and
        sending the input signal to a processing unit.

13. The method of claim 10, wherein said generating the first physical surface pattern with the haptic substrate further includes selecting one of a plurality of physical surface patterns in accordance with the first substrate activating signal.

14. The method of claim 10, further comprising: receiving a user input via a touch on the flexible surface layer; and providing a tactile feedback to confirm the user input.

15. The method of claim 10, wherein said activating the deforming generator to generate the deforming force further includes activating a vacuum generator and creating a vacuum between the flexible surface layer and the first physical surface pattern.

16. The method of claim 10, wherein said reconfiguring the surface texture of the flexible surface layer to change the surface texture from the first surface characterization to the second surface characterization in accordance with the first physical surface pattern further includes changing from a smooth surface to a coarse surface.

17. The method of claim 10, further comprising:
    generating a second physical surface pattern of the haptic substrate in response to a second activating signal received by the haptic substrate; and
    forcing the flexible surface layer against the second physical surface pattern of the haptic substrate to change the surface texture of the flexible surface layer from the second surface characterization to a third surface characterization in response to the second physical surface pattern.

* * * * *